United States Patent
Baratta

(10) Patent No.: US 6,626,166 B1
(45) Date of Patent: Sep. 30, 2003

(54) WASTE CONTAINMENT SEPARATION SYSTEM FOR AN ABRADING OR CUTTING DEVICE

(75) Inventor: Anthony Baratta, Oak Park, CA (US)

(73) Assignee: Electrolux Professional Outdoor Products, Inc., Cleveland, OH (US)

(*) Notice: Subject to any disclaimer, the term of this patent is extended or adjusted under 35 U.S.C. 154(b) by 119 days.

(21) Appl. No.: 09/661,957

(22) Filed: Sep. 14, 2000

Related U.S. Application Data

(62) Division of application No. 09/399,297, filed on Sep. 17, 1999, now Pat. No. 6,318,351.

(51) Int. Cl.$^7$ ................................................. B28D 1/04
(52) U.S. Cl. ........................ 125/13.01; 451/442; 125/12
(58) Field of Search ............................... 125/13.01, 12; 210/96, 188, 436, 472, 513, 532.1, 539; 451/446, 448, 451, 449, 450, 452, 453, 454, 455, 456, 442

(56) References Cited

U.S. PATENT DOCUMENTS

| | | | | |
|---|---|---|---|---|
| 3,844,743 A | * | 10/1974 | Jones | 210/188 |
| 4,116,843 A | * | 9/1978 | Koenig | 210/391 |
| 4,484,417 A | | 11/1984 | Klingerman | 51/267 |
| 4,515,607 A | * | 5/1985 | Wolde-Michael | 175/206 |
| 4,518,403 A | * | 5/1985 | Hertz | 210/151 |
| 4,690,762 A | * | 9/1987 | Katsura | 210/436 |
| 4,827,559 A | | 5/1989 | Norland | 15/322 |
| 4,998,775 A | | 3/1991 | Hollifield | 299/39 |
| 5,111,625 A | | 5/1992 | Simpfendorfer et al. | 51/267 |
| 5,122,267 A | * | 6/1992 | Giovanetti et al. | 210/188 |
| 5,167,215 A | | 12/1992 | Harding, Jr. | 125/13.01 |
| 5,477,844 A | | 12/1995 | Meister | 125/14 |
| 5,564,408 A | | 10/1996 | Bassols | 125/12 |
| 5,951,219 A | | 9/1999 | Stadtfeld et al. | 409/131 |
| 6,099,080 A | | 8/2000 | Hirashita et al. | 299/39.3 |
| 6,105,567 A | | 8/2000 | Sun et al. | 125/13.01 |
| 6,106,375 A | * | 8/2000 | Furusawa | 210/539 |
| 6,318,351 B1 | | 11/2001 | Baratta | |
| 6,375,558 B1 | | 4/2002 | Baratta | |

* cited by examiner

Primary Examiner—Timothy V. Eley
(74) Attorney, Agent, or Firm—Henricks, Slavin & Holmes LLP

(57) ABSTRACT

Abrading and cutting devices such as saws include waste containment systems and methods to improve removal of slurry or other contaminants from a work area during operations, and separation of slurry from a carrying medium such as air. A vacuum bar includes high and low vacuum openings to help focus flow and to conserve vacuum pressure. One opening faces the saw blade. A slurry containment and separation container includes walls and configurations for the inlets and outlets that enhance cleaner separation of the air and the slurry. Coolant is applied to the saw blade to make operation and cleanup more efficient. The vacuum generator can operate off of the power generated by the machine.

11 Claims, 18 Drawing Sheets

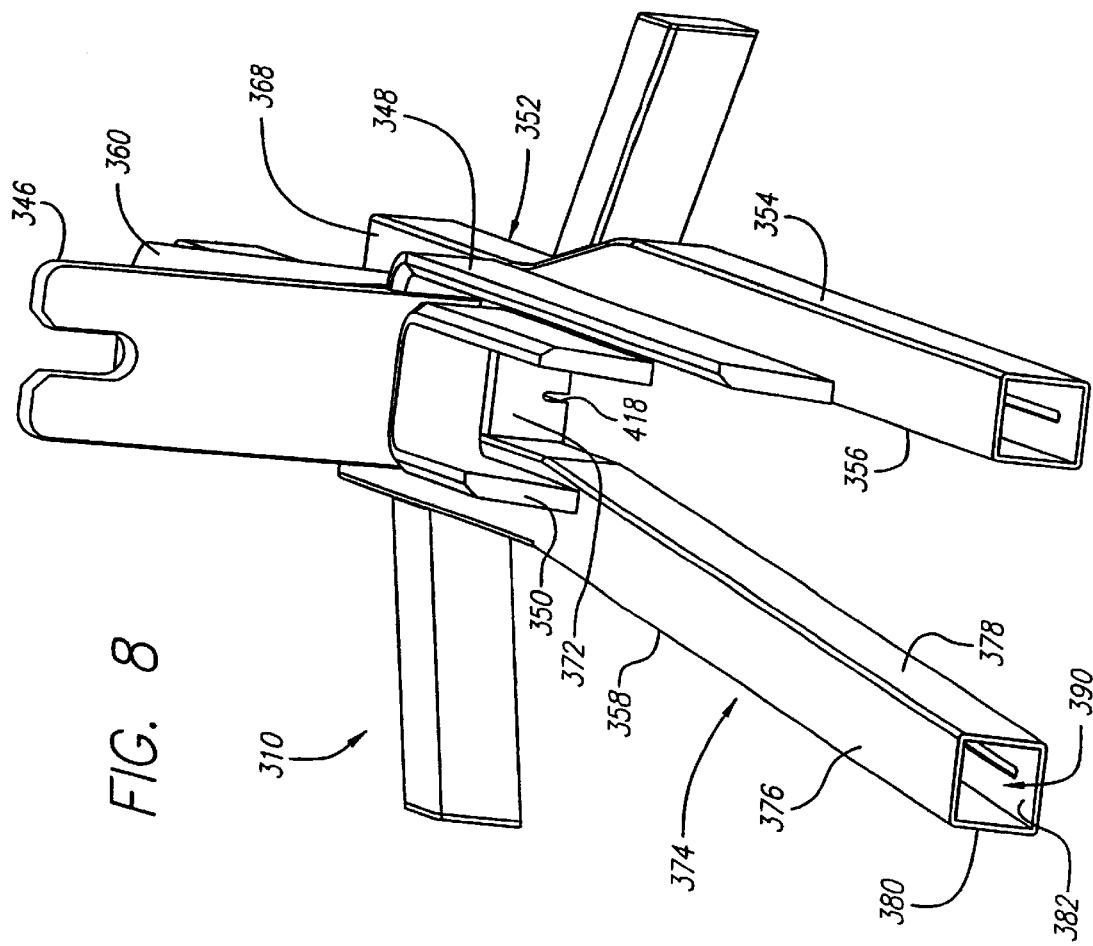
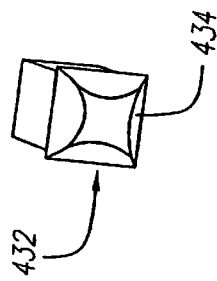

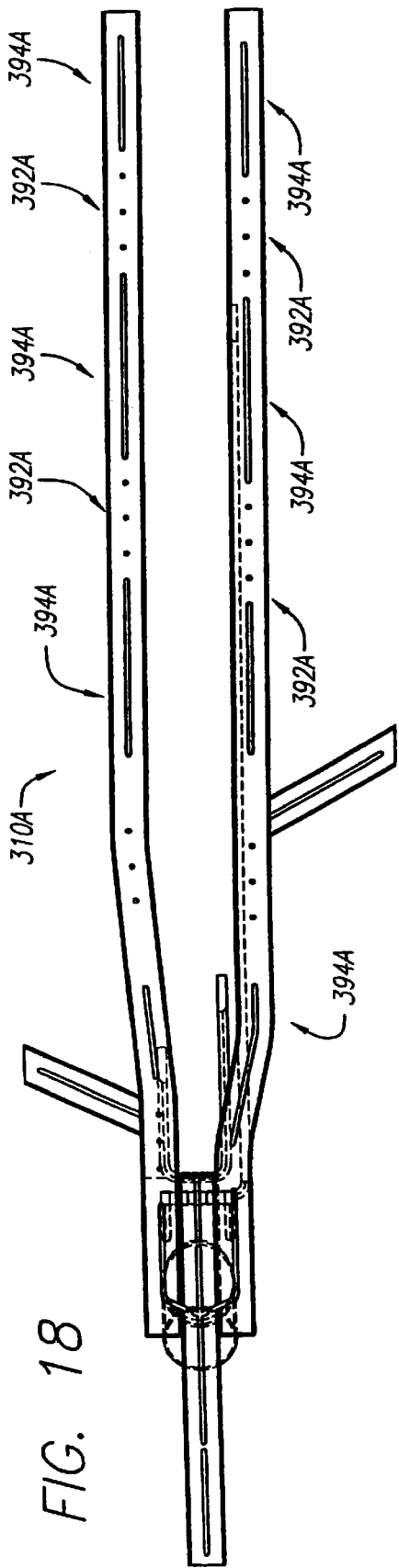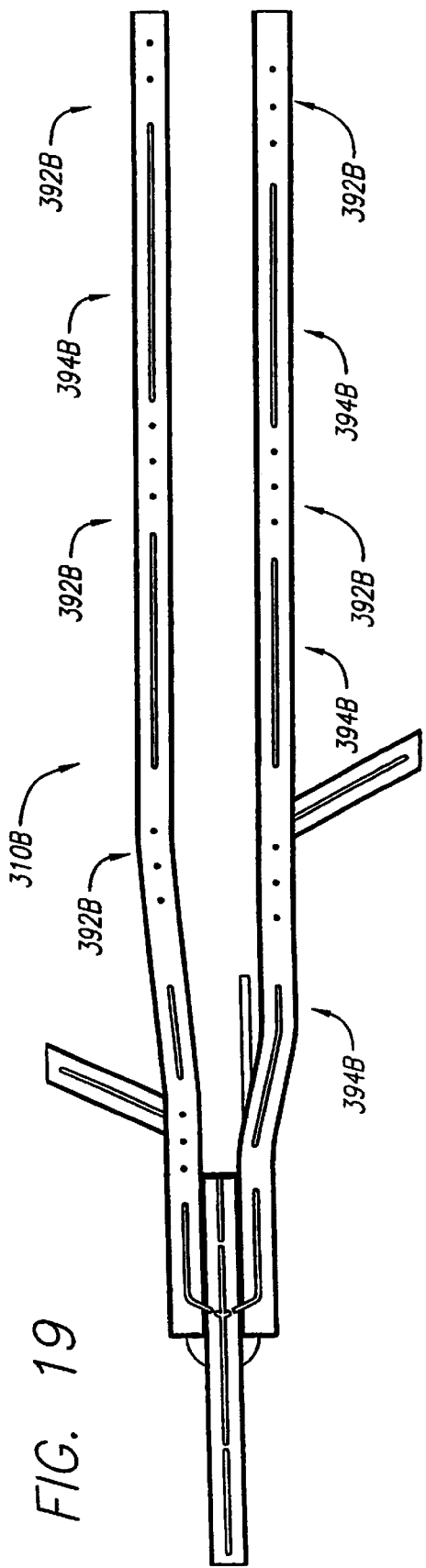

WASTE CONTAINMENT SEPARATION SYSTEM FOR AN ABRADING OR CUTTING DEVICE

CROSS-REFERENCE TO RELATED APPLICATIONS

This is a division of Ser. No. 09/399,297, filed Sep. 17, 1999, Pat. No. 6,318,351, issued Nov. 20, 2001. This application is related to co-pending application, Ser. No. 09/661,959, filed Sep. 14, 2000.

BACKGROUND OF THE INVENTIONS

1. Field of the Invention

The present inventions relate to abrading and cutting devices and methods, and more specifically to waste containment systems and methods for such devices and methods, for example slurry containment systems and methods for saws, cutters and the like.

2. Related Art

Pavement treatment apparatus and methods are known for concrete and asphalt saws which may include a vacuum apparatus for removing water and particulate matter, commonly referred to as slurry, from a work site. See Bassols, U.S. Pat. No. 5,564,408, entitled Pavement Treatment Method and Apparatus, the specification and drawings of which are incorporated herein by reference. As discussed in that patent, concrete and asphalt saws are typically used to cut joints for expansion and contraction of such materials in freeway pavement, aircraft runways, and other pavement surfaces. Typical saws are marketed under different brand names and include a diamond blade of different diameters according to the thickness of the pavement to be cut, such as 12, 14, 16, or 24-inch blades, etc., driven by an internal combustion engine. The engine is also used to drive a traction mechanism at the rear of the saw for advancing the saw along the pavement. A belt takes power from a pulley driven by the internal combustion engine for powering a transmission box to step down the revolutions per minute (rpm) of the engine to a suitable rate for driving the traction wheels of the saw and for driving the saw blade.

The saw blade includes a blade guard for protecting the blade during operation and for preventing injury while the blade is rotating. The blade guard also contains cooling water sprayed onto the blade so that the cooling water drops onto the pavement.

The saw also includes a structural support frame for supporting all of the components and for mounting the wheels to the saw. The frame supports the engine, the shaft for driving the saw blade, the traction transmission and the pulleys for powering the traction transmission from the engine, among other elements.

In operation, the saw is started and positioned in alignment with the desired cutting path, and lowered into engagement with the pavement while at the same time turning on the coolant spray to the blade. An additional vehicle or other source is located nearby for supplying water for cooling the blade through a suitable hose. As cutting continues, the water and resulting slurry from the abraded pavement is picked up by a suction or vacuum bar to minimize filling previously cut joints. The slurry and any air picked up by the vacuum bar is taken back to a separator tank for removing the slurry. A disposal hose transports waste from the collection tank through a diaphragm pump to a truck or other container for disposal.

SUMMARY OF THE INVENTIONS

Waste containment systems and methods are described for abrading and cutting apparatus which provide improved removal of slurry and improved operating life of various components in the system. Such systems and methods may be used on saws, such as pavement and concrete saws, other cutting tools, such as wall saws, core drills and other boring equipment, and the like. The systems and methods may be implemented as original equipment or as accessories in kit form or individual components.

In one aspect of one of the inventions, a material pickup element is provided for picking up a fluid, which may include solid particles forming a slurry. The pickup element may be a vacuum bar, vacuum shoe or other suction device, for example. Element includes a number of openings comprising at least one and preferably a set of low vacuum apertures and at least one and preferably a second set of high vacuum apertures. In a preferred embodiment, the high vacuum apertures pickup most if not all of the slurry, and the low vacuum apertures focus, collect, concentrate or align the slurry so that it can be more easily picked up by the high vacuum apertures. For example, the low vacuum apertures can center or bring in fluid from both sides of the vacuum element so that an adjacent high vacuum aperture can pickup the slurry. Using both low and high vacuum apertures helps to conserve vacuum pressure, or minimize the loss of vacuum through larger openings, especially where the amount of vacuum available is limited or fixed. Conversely, using both low and high vacuum apertures permits placement of high vacuum areas where they may be most beneficial, and reduction of aperture size at other areas of the pickup element where high vacuum would not have significant incremental value over others already included.

In one preferred form of the pickup element, the low vacuum apertures are round or similar holes and the high vacuum apertures are extended slots in the pickup element. The round holes may be grouped in a series, and the round holes may be co-linear with a slot. Other configurations, arrangements and orientations for the openings can be used.

In one preferred aspect of one of the inventions, the pickup element is used on a concrete or similar saw which moves along the work surface. The openings are preferably distributed over the pickup element so as to take advantage of the forward or backward motion of the saw. In one preferred embodiment, the high vacuum apertures are placed in front of the low vacuum apertures, which in turn may be followed by one or more additional high vacuum apertures. Alternatively, high and low vacuum apertures may alternate along the pickup element, for example beginning and ending with high vacuum apertures. The pickup element can then bring in fluid from both sides of the element, minimize or limit flow over the work surface and tailor the location or flow of the slurry relative to the pickup element.

In a further preferred aspect of one of the inventions, one or more of the apertures or openings may extend along a surface of the pickup element in a direction at least partly perpendicular to the work surface. For example, in a vacuum bar that extends horizontally, most of the apertures can open downwardly and extend horizontally over a horizontal surface of the vacuum bar and a high vacuum aperture can extend vertically or in a direction other than downwardly. A vertically extending high vacuum aperture can be advantageous directly behind the saw blade.

In a further aspect of one of the inventions, a system can be used for designing pickup elements. The system can include a processor or computer loaded with a computational fluid dynamics fluid flow optimizing program to optimize the flow of the slurry and maximize the suction created by the fan. Input parameters include maximum vacuum available, desired fluid flow rates through the pickup element, and the like. The system preferably identifies possible as well as optimum sizes and configurations for pickup elements, and potential and optimum sizes, configurations and distributions of vacuum openings. In one preferred embodiment, the system is used to identify the sizes, shapes and locations of openings to be used for picking up slurry, in addition to the sizes, shapes and locations of openings to be used for focusing, channeling or otherwise controlling flow of the slurry away from the pickup element.

In a further aspect of one of the inventions, the pickup element can include removable end caps having curved surfaces for more easily negotiating or riding over pebbles or other objects which may be in the line of travel. Having removable end caps makes for easier cleaning of the pickup element.

In another aspect of one of the inventions, a tool guard such as a blade guard includes a water supply conduit or tube for projecting or spraying fluid onto the tool. The fluid may be used as a lubricant and/or coolant for the tool. The fluid is directed toward the tool at an angle different than 90 degrees. For example, the fluid can be directed backward toward an on-coming surface of the tool. Directing the fluid backward relative to the motion of the tool reduces the amount of fluid thrown forward of the tool. Consequently, the amount of fluid to be picked up at the front of the tool is reduced. In one preferred embodiment, the fluid is directed backward about three degrees from a line perpendicular to the tool, such as a blade.

In a further aspect of one of the inventions, a separation system and method are provided for separating air and a second fluid. A receptacle is provided for receiving a combination of air and the second fluid, the receptacle including at least two vertically extending walls joining at a vertically extending angle. An inlet receives a combination of air and the second fluid and allows the combination to flow into the receptacle. A first outlet passes the second fluid from the receptacle and a second outlet passes air from the receptacle. This configuration contributes to providing a receptacle which more completely separates the air from the second fluid. This configuration makes the flow and disposition of the second material more controlled or organized, while promoting more uncontrolled or disorganized air flow. This type of receptacle configuration also reduces any tendency toward cyclone-type action in the fluid flow, for the air and for the second fluid. It also reduces the amount of symmetry in the surfaces in the receptacle, and in combination with other features, reduces residual splashing of the second fluid.

In another aspect of one of the present inventions, an inlet for a separation system discharges the air and fluid combination closer to the bottom of the receptacle than to the top. With this configuration, the fluid has a shorter distance to travel to the bottom of the receptacle, reducing the amount of splashing and reducing the amount of time the moving air from the inlet is around the moving fluid from the inlet. Additionally, when the outlet for the air is at the top of the receptacle, the air will have more time and area for shedding fluid before leaving the receptacle. Consequently, the air leaving the receptacle has a lower fluid content. Furthermore, where the fluid has abrasive, corrosive or other harmful material, the amount of harmful material leaving the receptacle through the air outlet and reaching other components is reduced.

In an additional aspect of one of the present inventions, an air outlet for a receptacle in a separation system is positioned off of a line, axis or plane of symmetry. Positioning of the air outlet in this way removes air that is less controlled or less organized earlier than air in other locations of the receptacle where the air may be more channeled. In one preferred embodiment, the only plane or line of symmetry for the air outlet is one between vertically extending walls of the receptacle. Locating the air outlet on this plane of symmetry reduces the possibility of exiting air pulling with it condensed fluid from either of the walls.

In a further aspect of one of the present inventions, an inlet for a separation system discharges an air and fluid combination into a receptacle between two vertically extending walls, and closer to one vertically extending wall than to the other. This asymmetry tends to reduce splashing of the second fluid and contributes to greater control, containment or organization of the second fluid.

In one aspect of the present inventions, a tool is provided for working a material, such as cutting concrete, where the tool is driven by a drive element, such as a drive shaft. Vacuum is created by a vacuum generator driven by the same drive shaft that drives the tool. Such a design provides for a compact and self-contained combination of tool and waste containment system. The design also makes it easier to assemble the combination as a tool and kit for easy assembly and disassembly.

These and other aspects of the present inventions will be better understood after a consideration of the drawings, a brief description of which follows, and the detailed description of the preferred embodiments of the inventions.

BRIEF DESCRIPTION OF THE DRAWINGS

FIG. 8 is a left front isometric view of a material pickup element such as a vacuum bar in the accordance with a further aspect of one of the present inventions.

FIG. 18 is a bottom plan view of a vacuum bar having a further arrangement of openings.

FIG. 19 is a bottom plan view of a vacuum bar having another arrangement of openings.

DETAILED DESCRIPTION OF THE PREFERRED EMBODIMENTS

The following specification taken in conjunction with the drawings sets forth the preferred embodiments of the present inventions in such a manner that any person skilled in the art can make and use the inventions. The embodiments of the inventions disclosed herein are the best modes contemplated by the inventor for carrying out the inventions in a commercial environment, although it should be understood that various modifications can be accomplished within the parameters of the present inventions.

In accordance with several aspects of the present inventions, a waste containment system and method are provided for abrading, cutting or coring machines. While the description herein will be directed primarily to cutting machines, and while the preferred embodiments will be described with respect to applications to concrete saws, it should be understood that the inventions can be applied to any number applications other than concrete saws and other cutting machines. The concepts are applicable to other machines in a manner similar to how they would be applied to concrete saws as described herein. For example, the high and low vacuum openings on a material pickup element can be applied to any number applications, while they are especially pertinent to those where the amount of vacuum is limited or fixed. As another example, the separation receptacle can take any number of configurations given the concepts described herein. Moreover, other aspects of the inventions described herein can be used in any number of applications.

A waste containment system and method on a concrete saw in accordance with various aspects of the present inventions provide an efficient and reliable apparatus and method for limiting or entirely removing any waste material created or generated while cutting concrete. The system and method removes a substantial amount of water or other coolant produced during the cutting process. The vacuum used to remove the slurry can be easily generated through the engine or other power plant on the saw without noticeably reducing its output. Waste material can be reliably removed from the vacuum system so as to reduce contamination or fouling of components, and to give an acceptable operating lifetime to the components. The system and methods can be implemented as a complete product or as individual components, such as in kit form. All parts can be made removable, and they can be used to retrofit many existing saws.

Figure 1:
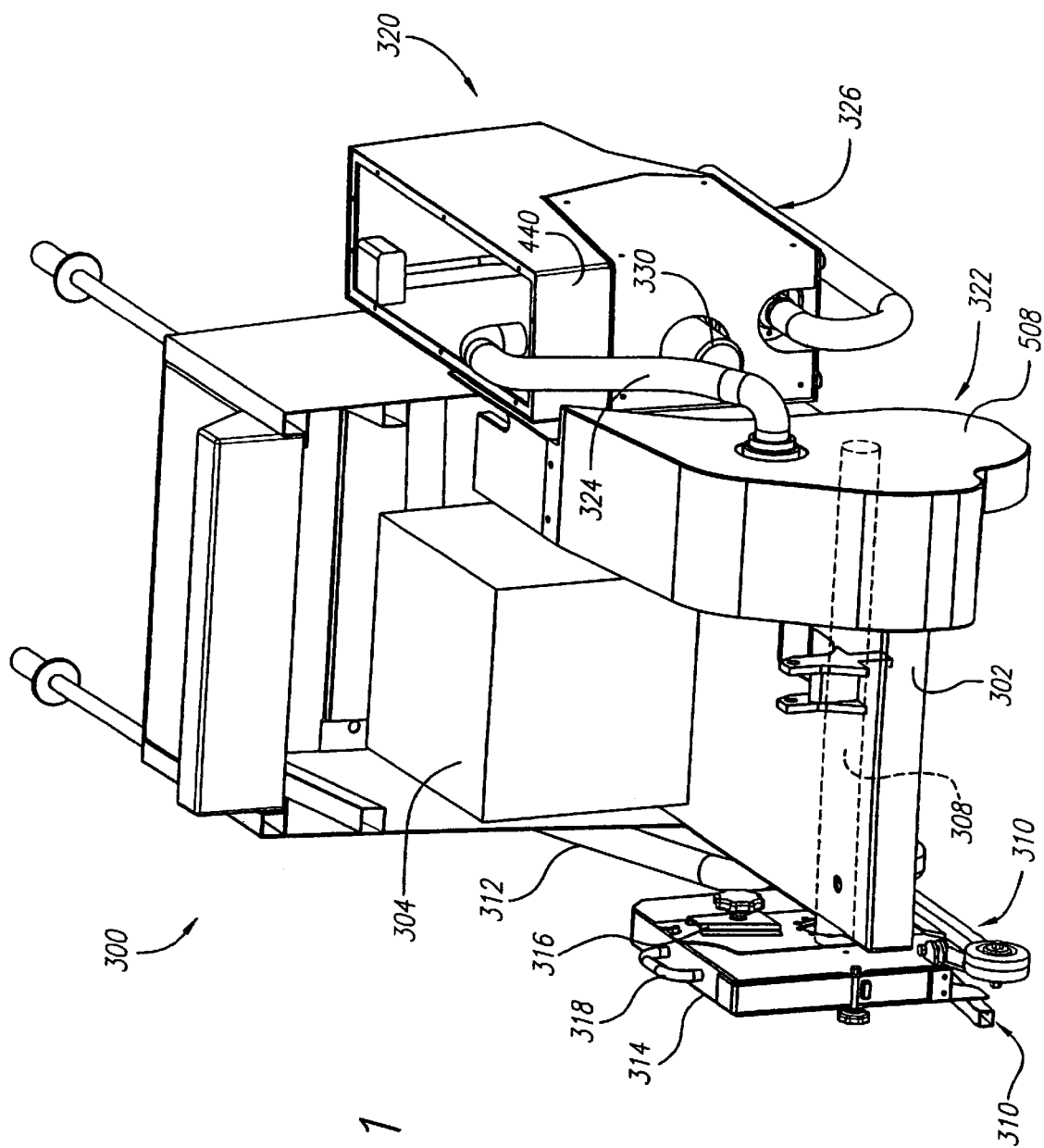
FIG. 1 is a left front isometric view of a cutting device in the form of a saw incorporating a waste containment system in accordance with several aspects of the present inventions.

In accordance with one aspect of the present inventions, a concrete saw 300 (FIG. 1) includes a frame or chassis 302 supporting an engine, shown schematically as 304, for driving a saw blade 306 through a drive shaft 308. The engine and the drive shaft, as well as other transmission components, also drive and power other components of the saw, as is known to those skilled in the art of concrete saws. The saw and saw blade can also be powered and driven by an electric motor, and all of the components on it can be driven or energized electrically.

The saw also includes a material pickup element in the form of a vacuum bar 310 to which is coupled a preferably 2 inch diameter vacuum hose 312 for removing a slurry of water and particulates created during cutting. Water is provided through a conduit (not shown) to the inside of the blade guard 314 to act as a coolant for the blade 306. The particulates are typically bits of concrete both large and small produced during cutting. Other waste material will be produced using other equipment on different work surfaces, but many of the concepts described herein will be similarly applicable. The blade guard 314 is preferably similar or identical to a blade guard described in U.S. Pat. No. 5,564,408, and is supported by a blade guard mount 316, shown in FIG. 1 configured for mounting on a saw such as that manufactured by Cushion Cut. The blade guard includes a top mounted handle 318 for ease of access.

Figure 2:
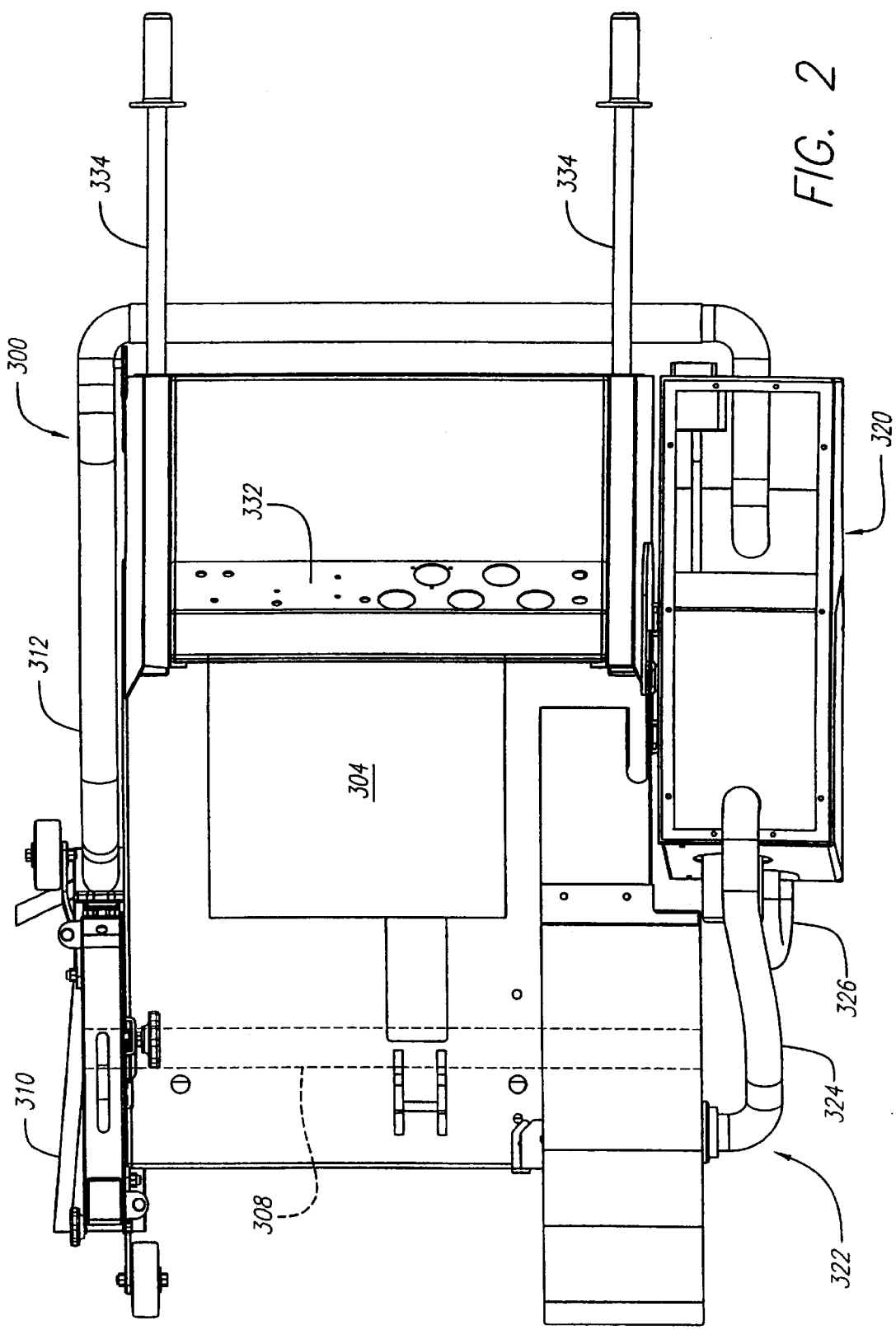
FIG. 2 is a top plan view of the saw of FIG. 1.
Figure 3:
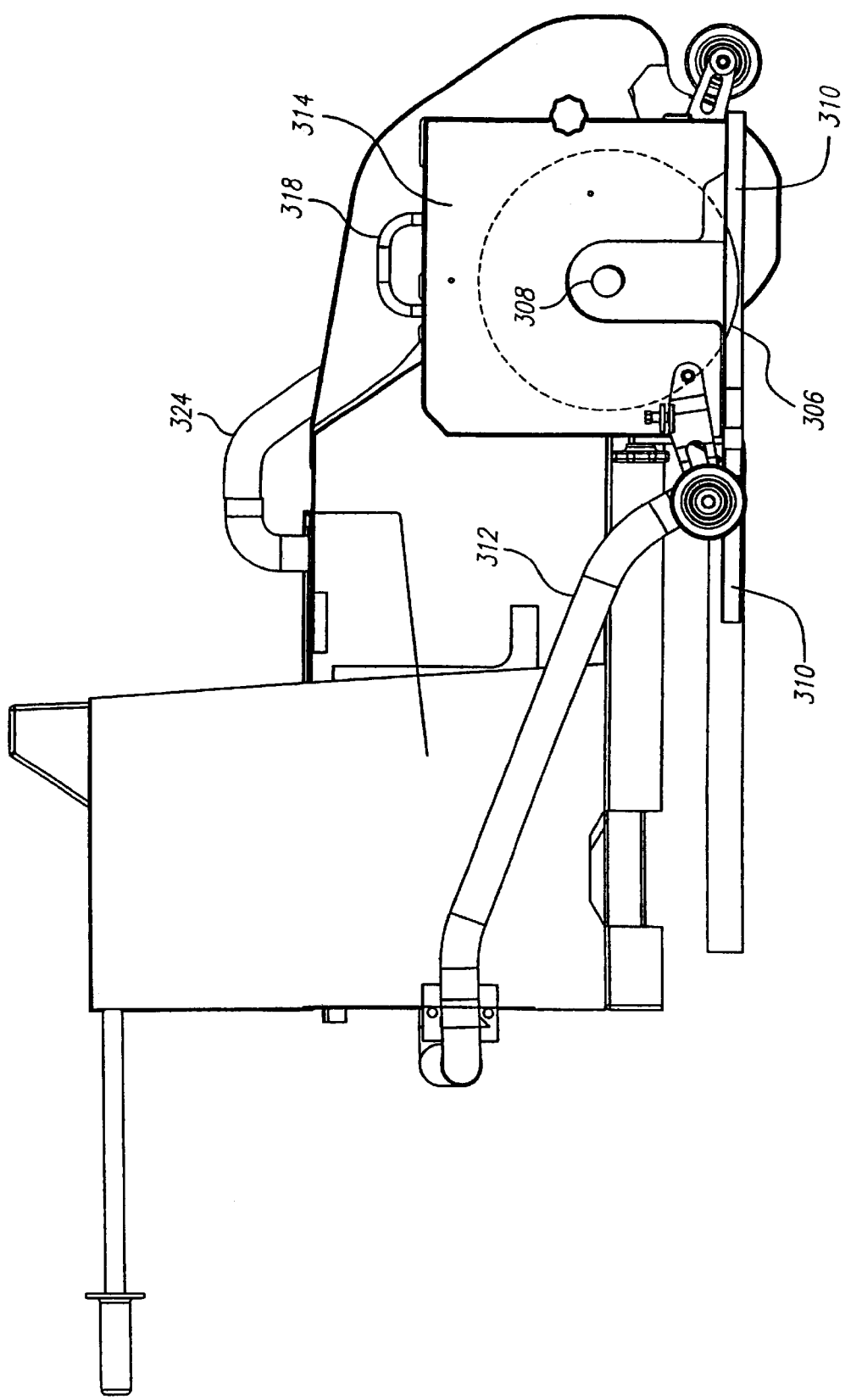
FIG. 3 is a right side elevation view of the saw of FIG. 1.
Figure 4:
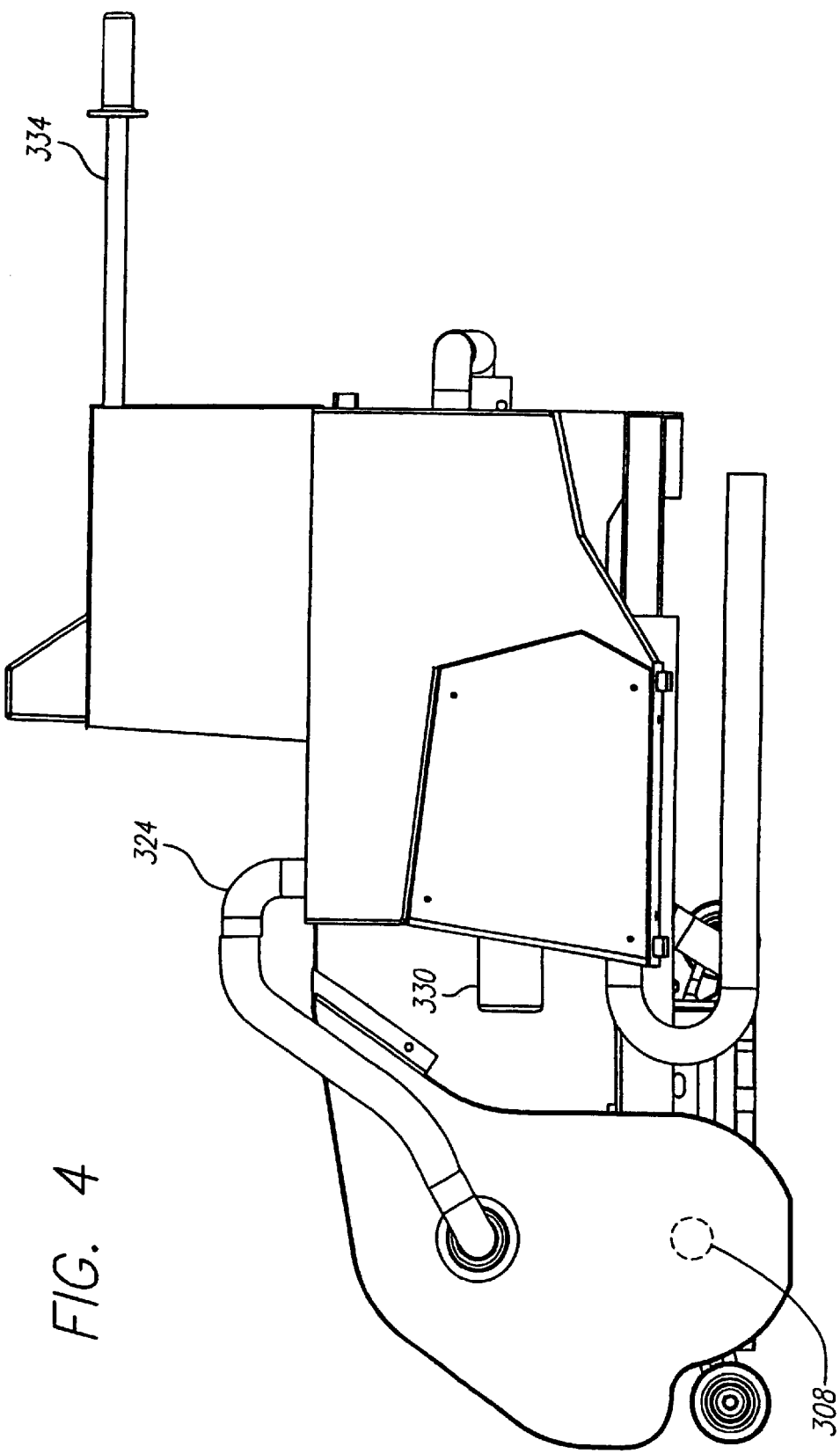
FIG. 4 is a left side elevation view of the saw of FIG. 1.
Figure 5:
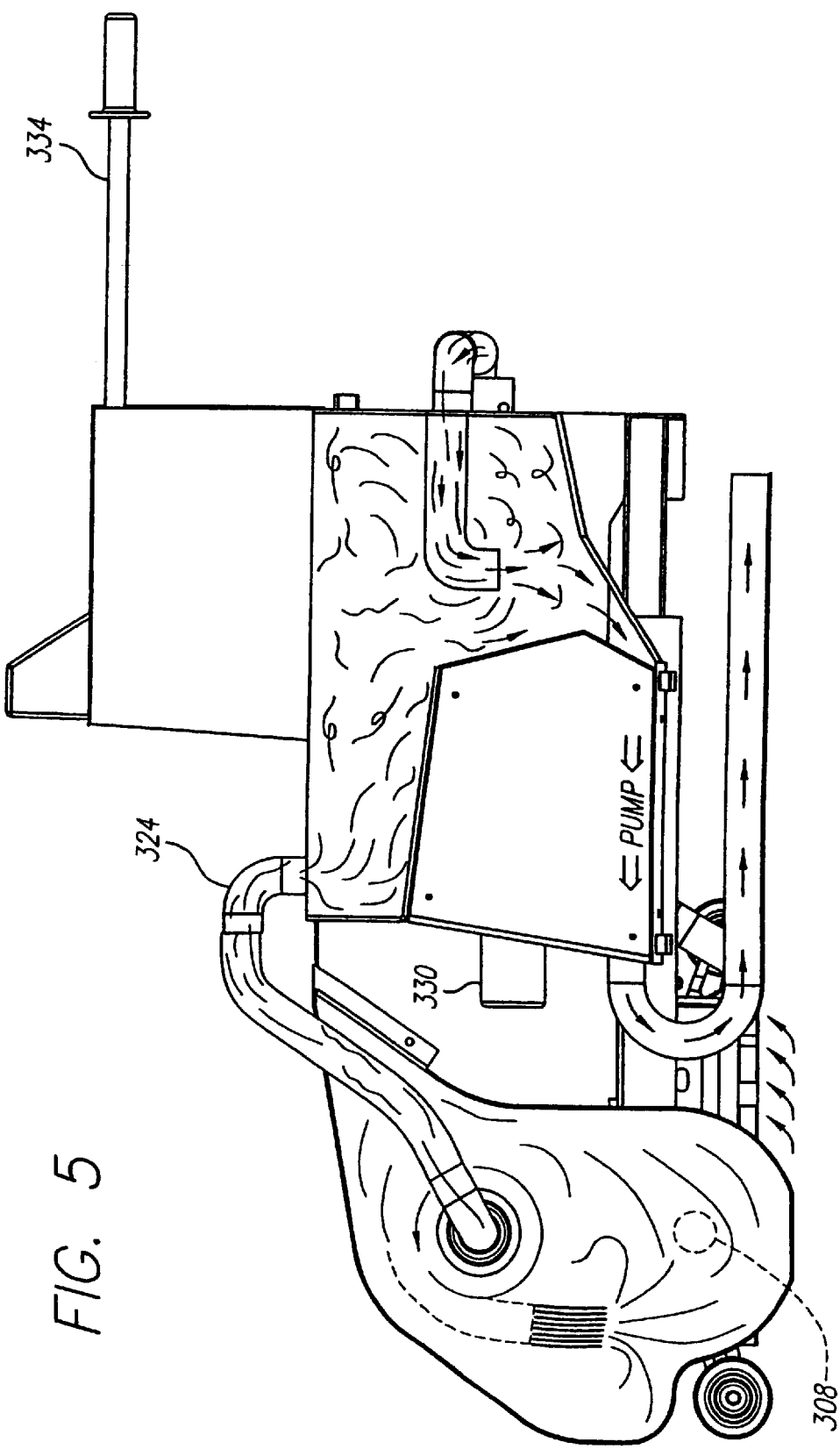
FIG. 5 is a schematic and flow diagram showing the flow of air and fluids through a waste containment system in accordance with several aspects of the present inventions.

The vacuum hose 312 extends as short a distance as possible to a slurry recovery and separation assembly 320 (FIG. 2) for transporting the slurry from the vacuum bar 310 to the assembly 320. The vacuum hose 312 is preferably raised as little as possible above the level of the vacuum bar 310 so as to use as little vacuum as possible raising the slurry to the level of the assembly 320. The assembly 320 is preferably located on a side or a surface of the saw 300 different from the right side where the blade is located so as not to obstruct the view that the operator has of the cutting area.

Vacuum is created in the assembly 320, and therefore through the vacuum hose 312 and in the vacuum bar 310, through a vacuum generator 322 coupled to the assembly 320 through a vacuum hose 324. The vacuum generator 322 is driven by the drive shaft 308, as discussed more fully below, and is controlled by the revolutions per minute (rpm) of the drive shaft. Alternatively, where the saw is electrically powered, the vacuum generator could be driven by current from the saw motor.

Figure 12:
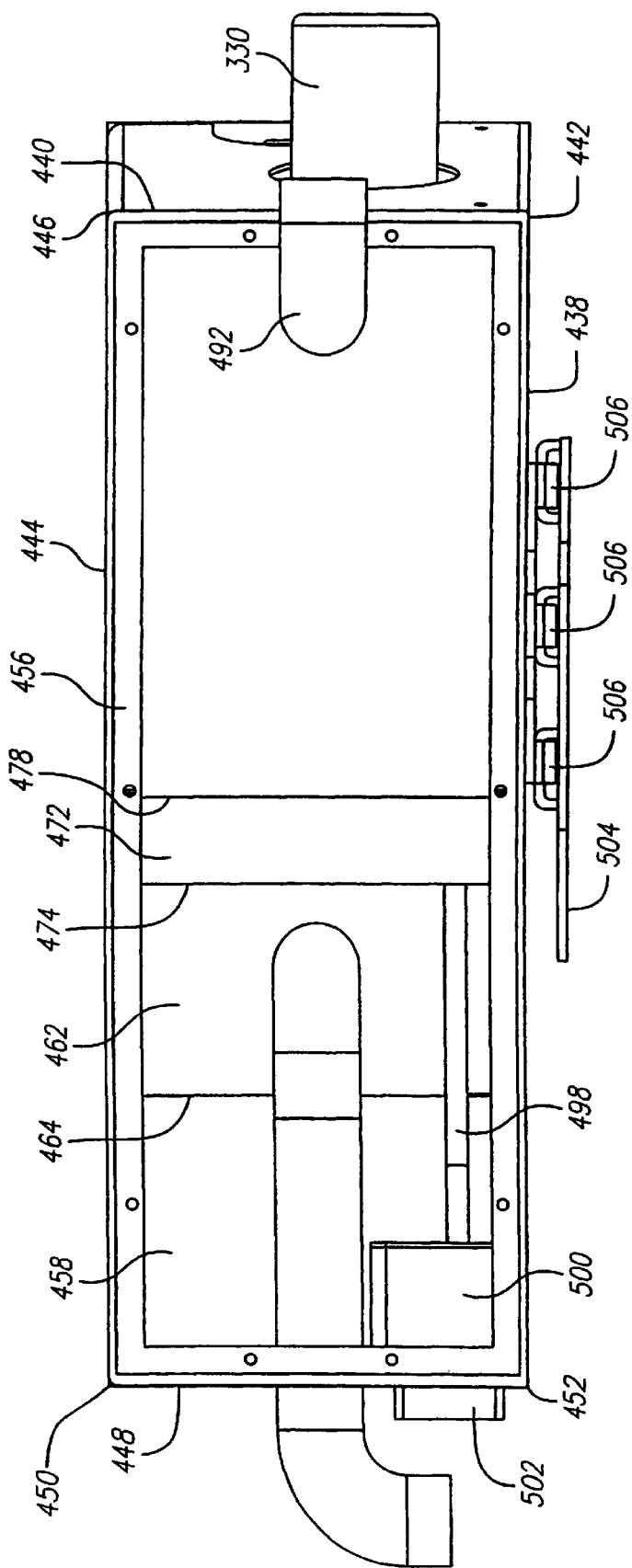
FIG. 12 is a horizontal cross-sectional view of the top of the container and pump of FIG. 10 showing the slurry input, the air output and a mounting assembly.
Figure 13:
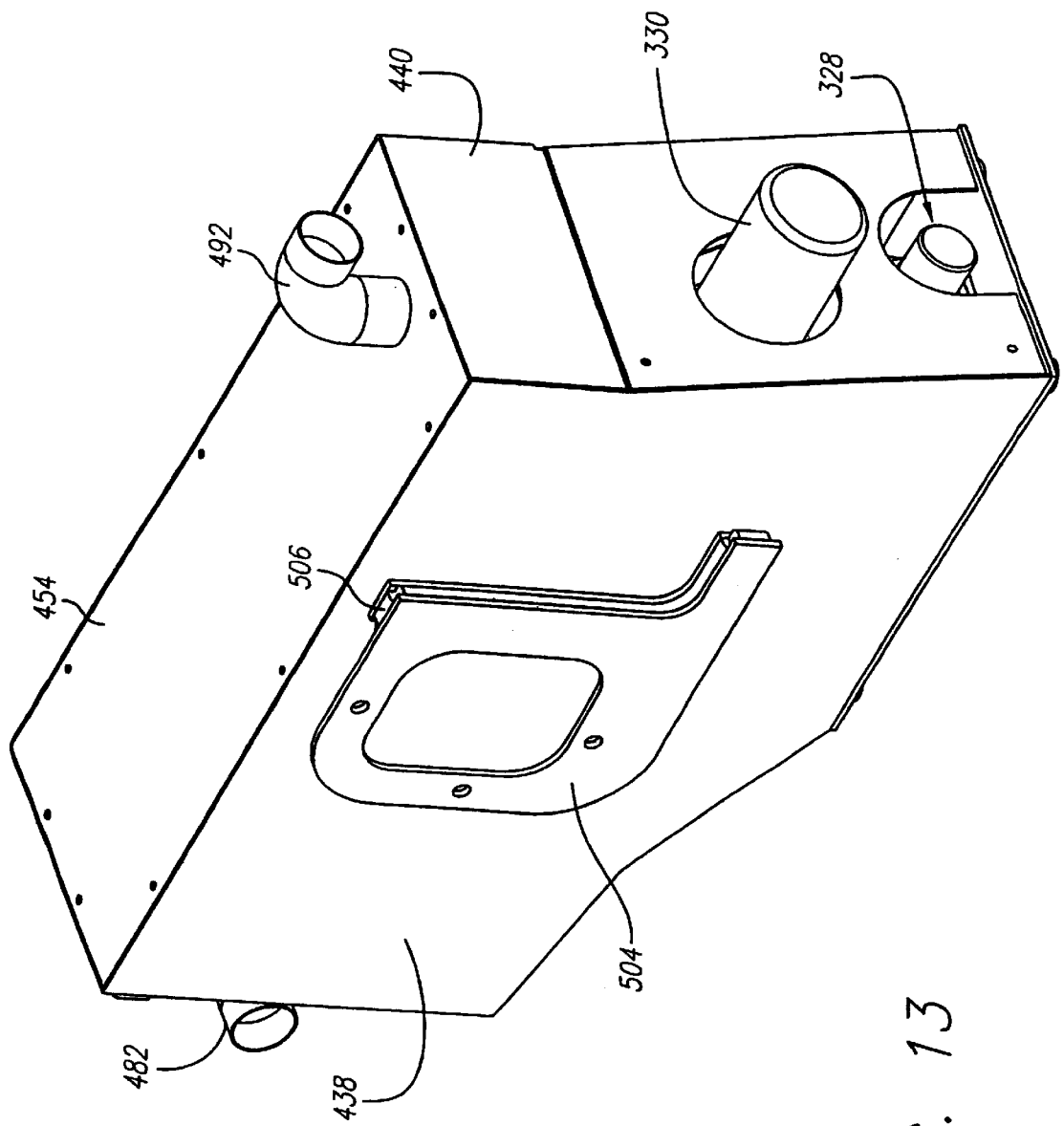
FIG. 13 is an upper right isometric view of the container and pump of FIG. 10.

Waste is removed from the assembly 320 through a waste pipe 326 through a pump 328 (FIG. 12) operated by a motor 330. The pump 328 is similar to that described in U.S. Pat. No. 5,564,408 but includes metal reinforcing on several of the moving parts of the pump. The motor 330 is preferably an electric motor driven by current developed in an alternator or generator on the engine 304. The pump also preferably includes conventional flap valves to control flow and prevent back flow on each side of the pump.

The vacuum bar 310, modified blade guard 314, vacuum hose 312, assembly 320 and the vacuum generator 322 may be factory installed or produced as components for a kit or for retrofit on existing saws. The remaining components of the saw are typical, and do not require enhancements or extraordinary modifications. Some of the other typical components of the saw are illustrated for context such as the display panel 332 and handles 334. While enhancements can be made to the basic saw to further optimize the operation, for example with larger saw blades, it is not believed that such modifications are necessary for proper operation.

Figure 6:
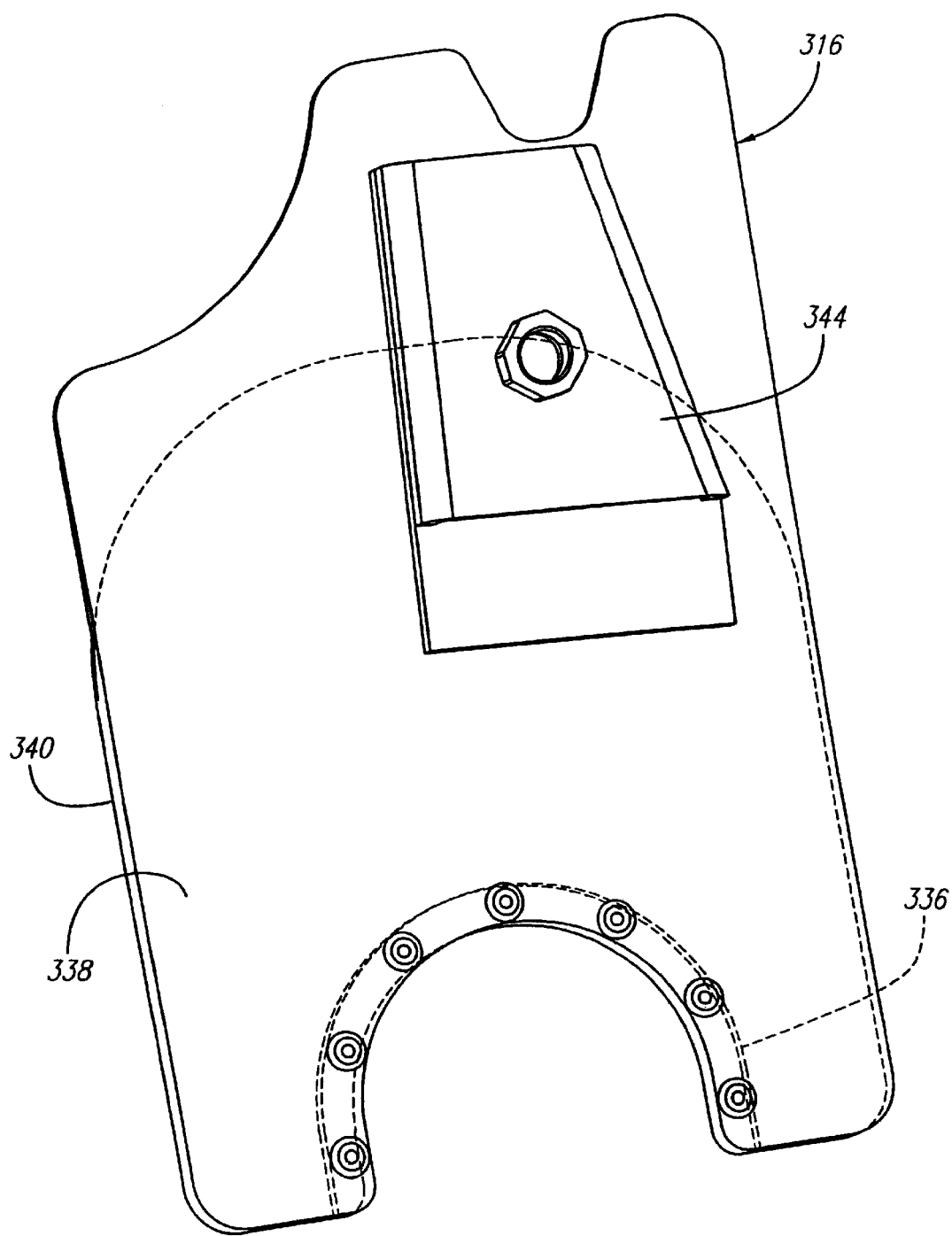
FIG. 6 is a lower left front isometric view of a blade guard support in accordance with another aspect of the present inventions.
Figure 7:
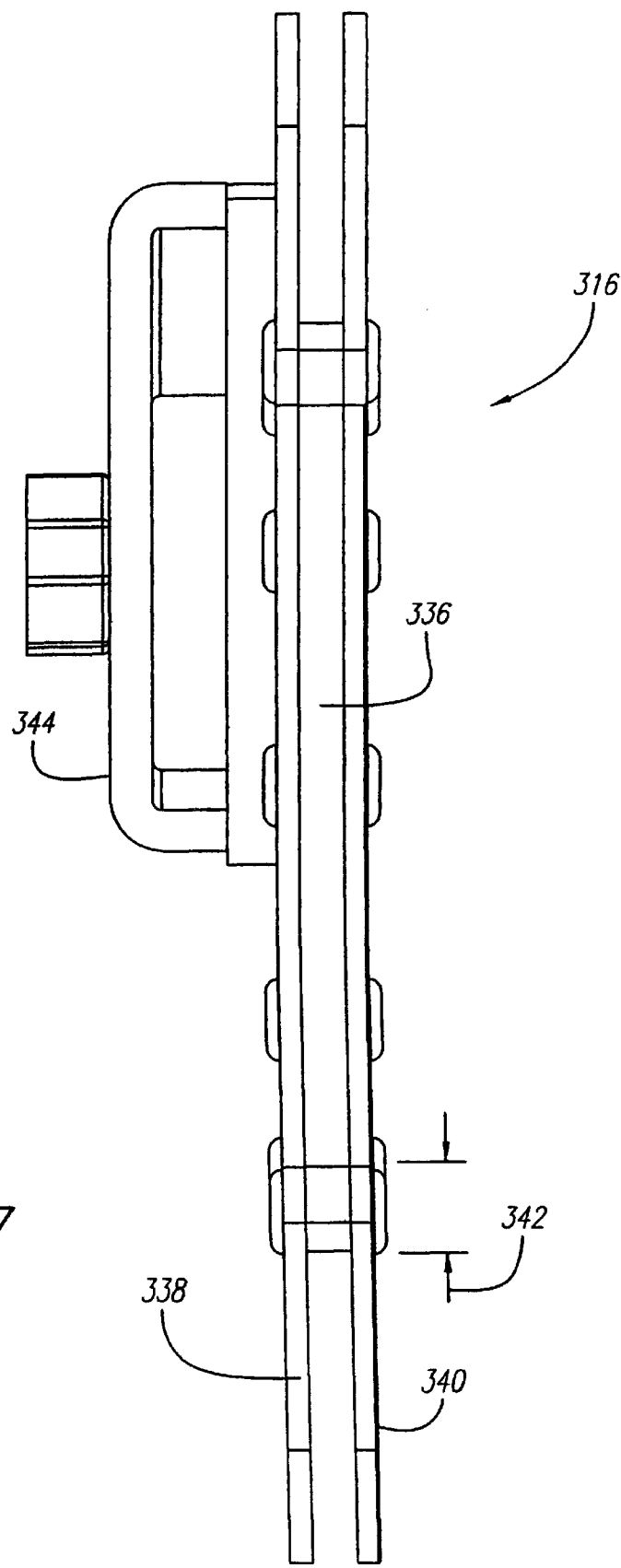
FIG. 7 is a bottom plan view of the blade guard support of FIG. 6.

The blade guard support 316 (FIGS. 1, 6 and 7) is similar to that described in U.S. Pat. No. 5,564,408, and includes a spacer 336 having a width defining the spacing between the left plate 338 and right plate 340, but also a depth 342 to provide more strength to withstand bending or buckling of the plates 338 and 340. A mounting holster 344 accepts the support element of the saw for supporting the blade guard.

The vacuum bar 310 (FIGS. 8 and 9) for picking up the slurry from around the saw blade and from grooves is similar to the vacuum bar described in U.S. Pat. No. 5,564,408 in the context of concrete saws. The vacuum bar is supported by the blade guard and held stationary relative to the blade guard by a mounting plate 346 through a mounting bolt (not shown). The position of the vacuum bar relative to the blade guard can be adjusted through the mounting bolt for adjusting the spacing between the bottom of the vacuum bar and the work surface. The preferred spacing for effective pickup of slurry from the work surface may depend on a number of factors such as the size of the vacuum bar and the number openings, as well as the vacuum developed at the vacuum bar and the surface makeup. The spacing will also depend on the uniformity of the work surface and how much large debris is created during cutting. For concrete, the spacing may be about $1/16^{th}$(one-sixteenth) of an inch, and greater for asphalt.

Figure 9A:
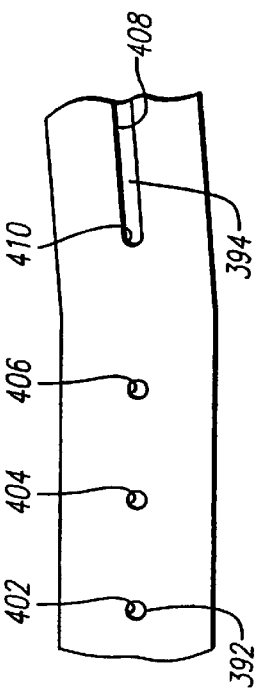
FIG. 9 is a bottom plan view of the vacuum bar of FIG. 8 showing high vacuum and low vacuum openings.
Figure 9:
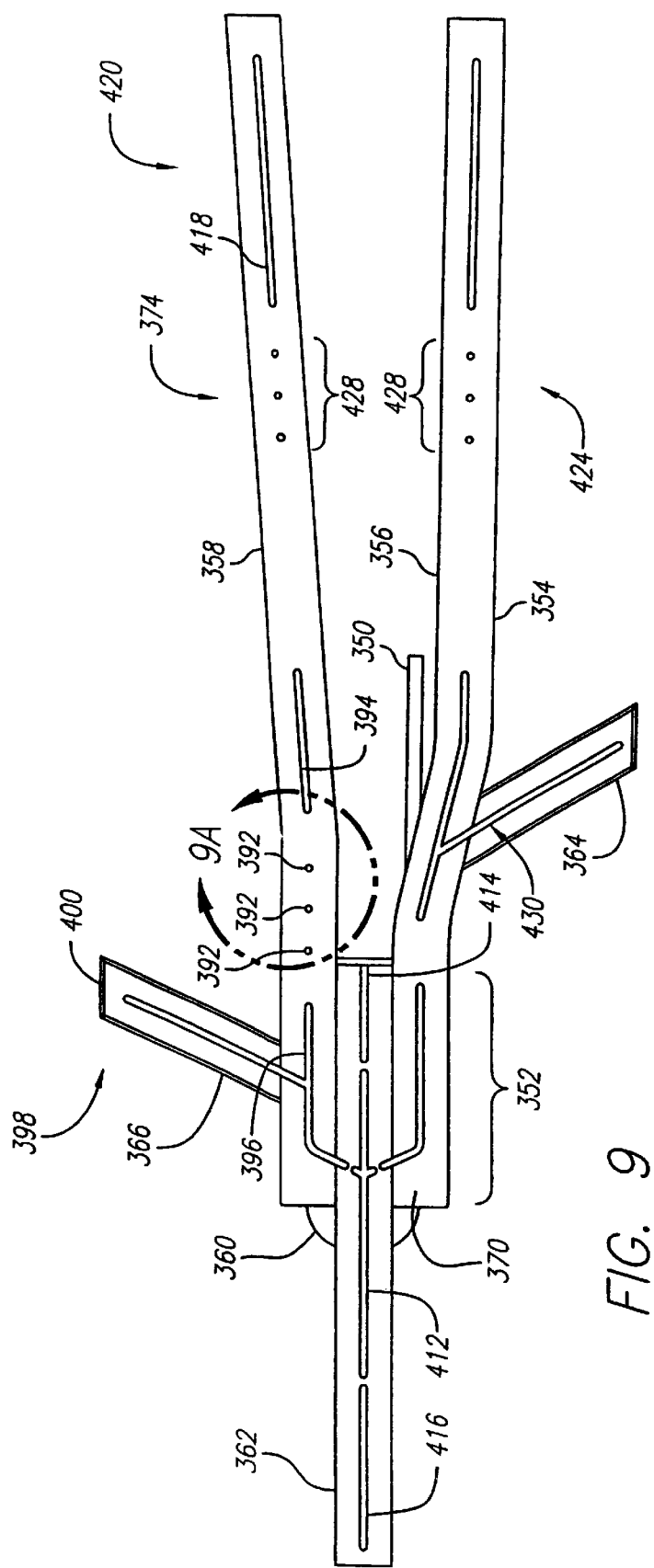
Figure 10:
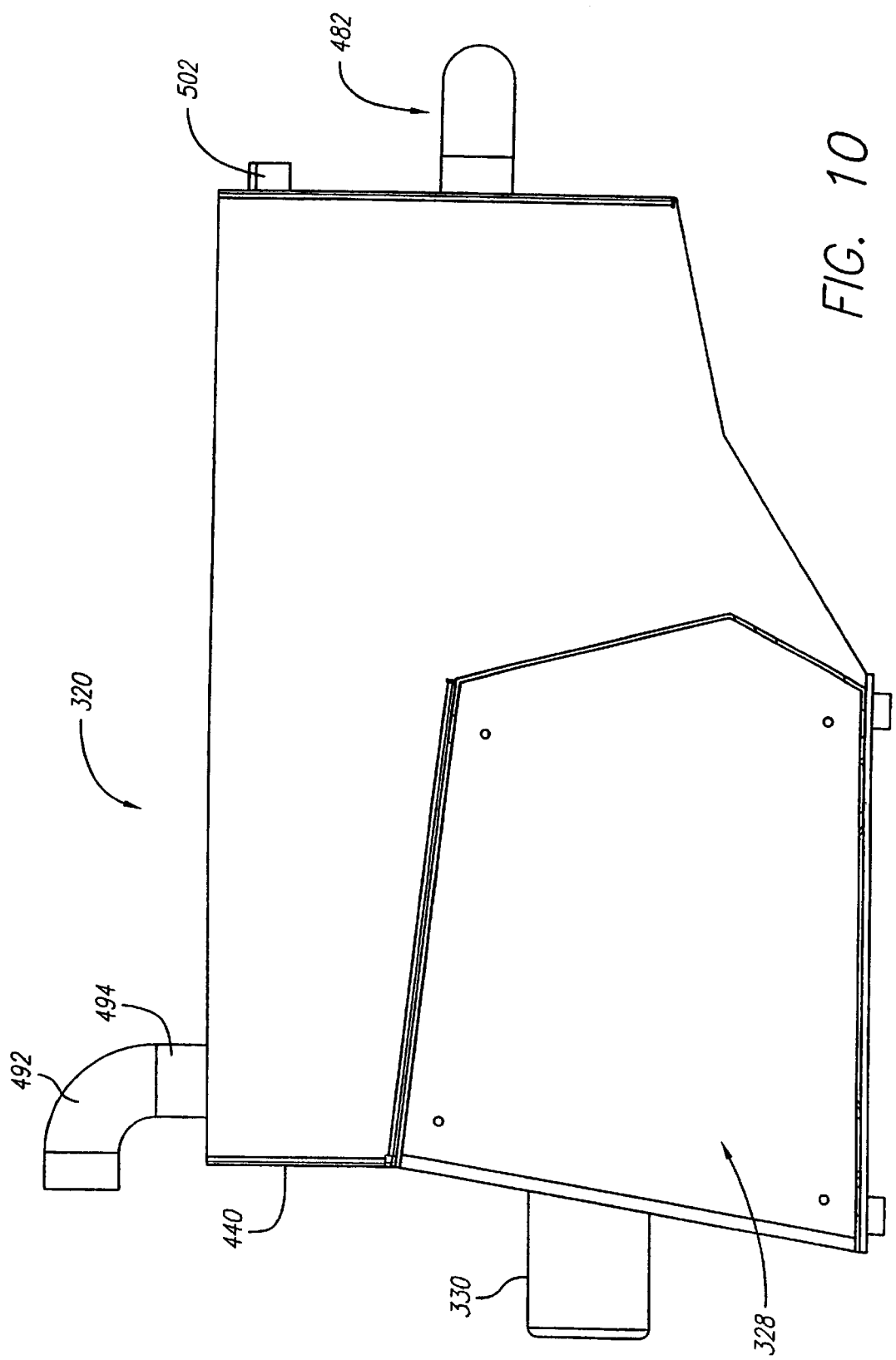
FIG. 10 is a left side elevation view of a container and pump for use with the containment system of FIG. 1.
Figure 11:
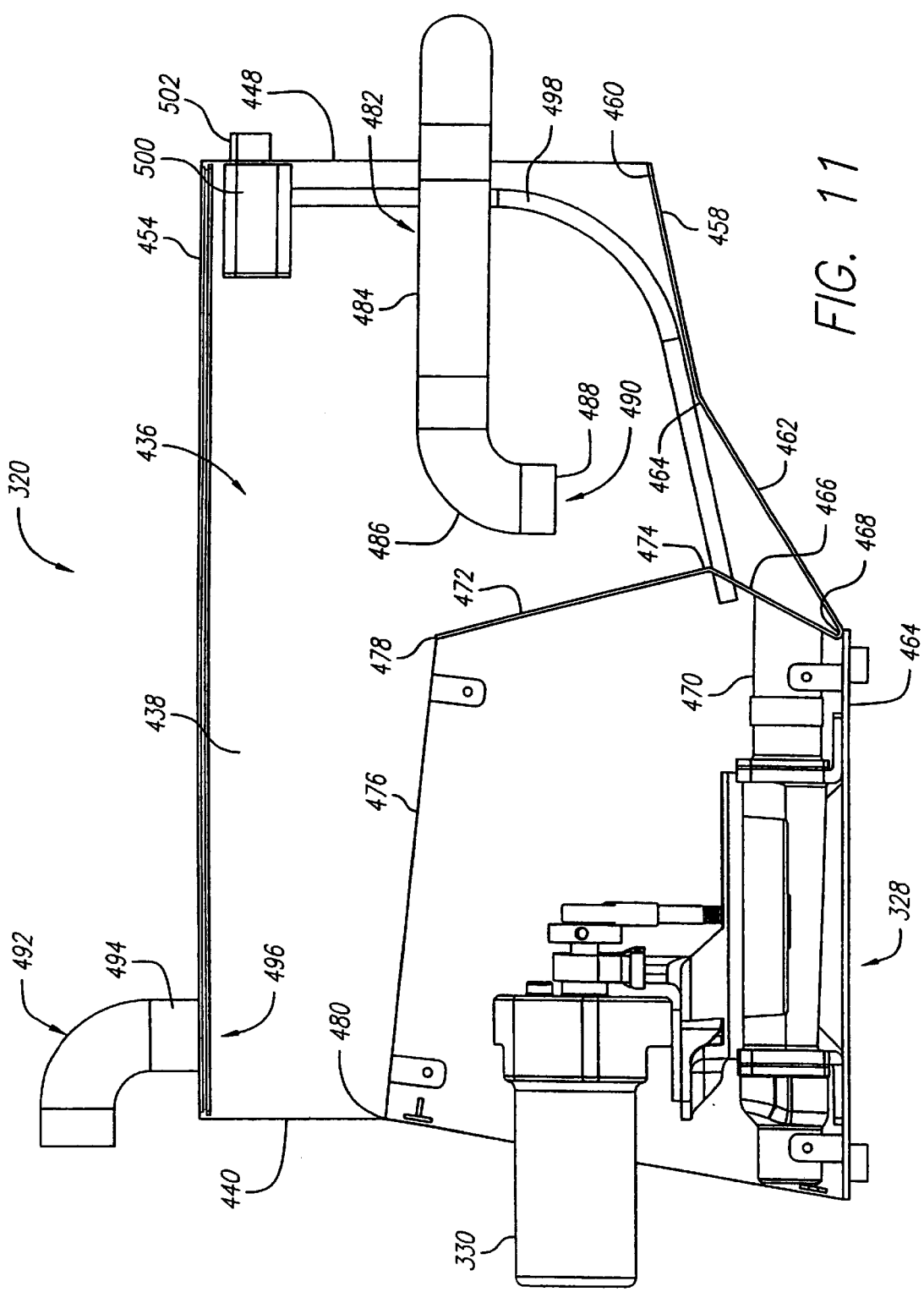
FIG. 11 is a vertical cross-sectional view of the left side of the container and pump of FIG. 10 showing an air and slurry input, a waste output and an air output.

The vacuum bar is also supported or stabilized by a left side wall 348 and a U-shaped internal blade guard wall 350. The left side wall 348 is welded or otherwise mounted to the mounting plate 346 and to the top of the vacuum bar manifold 352, as well as to the left vacuum tube 354 adjacent an inner side surface 356. The right side and rear of the wall 350 are mounted to the top surfaces of the right vacuum tube 358 and manifold 352, respectively. Part of the left side of the wall 350 is welded to the top of the left vacuum tube 354, and a remainder extends between the right vacuum tube 358 and the left vacuum tube 354 (FIG. 9). Various reinforcing walls can also be included. The vacuum coupling 360 is mounted to the top of the manifold 352 for accepting the vacuum hose 312. The tail 362 of the vacuum bar extends rearwardly from the center of the manifold 352. The left side vacuum tube 364 extends at an angle from the left vacuum tube 354 to the left side and toward the front, and the right side vacuum tube 366 extends to the right side from the right vacuum tube 358 and toward the front. The left side vacuum tube 364 joins the left vacuum tube 354 at a point forward of the manifold 352 in order to make room for other hardware on the saw.

As shown in FIGS. 8 and 9, the vacuum bar 310 defines a housing beginning with the manifold 352 and having a plurality of housing walls such as the top 368 of the manifold, the bottom wall 370 of the manifold, and a front manifold wall 372. The housing of the vacuum bar also includes a first housing wall 374 defining the right vacuum tube 358 and comprising a top wall 376, a left side wall 378, a right side wall 388, and a bottom wall 382, and closed off by a preferably removable end cap (FIG. 8A). The first housing wall 374 is shown having a square, longitudinally extending configuration or cross-section defining a channel 390 closed by the end cap on one end and joining the manifold at the other end adjacent the forward wall 372. Other configurations are possible, but a square cross-section is preferred to enhance pickup and transport of the slurry. The other vacuum tubes are also preferably square in cross-section.

The bottom wall 382 includes a plurality of opening walls defining a plurality of apertures passing through the bottom wall 382 to permit a pressure differential across the bottom wall between the channel 390 and the outside of the tube 358 when vacuum is applied to the vacuum coupling 360. The plurality of apertures includes at least one low vacuum aperture 392 and at least one high vacuum aperture 394. The high vacuum aperture picks up most if not all of the slurry in its region and the low vacuum aperture focuses, collects concentrates or aligns the slurry so that it can be more easily picked up by a high vacuum aperture, typically a different high vacuum aperture. Some pickup may occur with the low vacuum apertures. It is believed that the low vacuum apertures center or bring in fluid from both sides of the vacuum bar so that it can be picked up by a high vacuum aperture following behind. For example, a trailing high vacuum aperture 396 generally aligned with the preceding low vacuum apertures 392 will pickup the slurry gathered by the apertures 392. The trailing high vacuum aperture 396 is formed in the bottom wall 370 of the manifold. Additionally, though not necessarily, a side high vacuum aperture 398 formed in the bottom surface or wall 400 of the right side vacuum bar 366 may also pickup slurry gathered by the low vacuum apertures 392. It should be noted that aperture 398 will also pickup water splashed away from the saw blade, which would not typically include any particulates generated during cutting.

Using high vacuum and low vacuum apertures helps to conserve vacuum pressure or minimize the loss of vacuum through larger openings, especially where the amount of vacuum available may be limited by the size of the saw, available horsepower, and the like. They are also helpful, for a given size of saw, where larger blades are used in place of smaller blades. With a larger blade, the vacuum bar 310 is longer in overall dimension, preferably extending at least to the front of the blade guard if not further forward. For a given saw, a 30 inch blade would preferably include a vacuum bar 310A (FIG. 18) that was about 44 or 45 inches long, whereas the suction bar shown in FIGS. 8 and 9 was designed for a 16 inch blade and is about 27 or 28 inches long. A 26 inch blade would preferably include a vacuum bar 310B (FIG. 19) that was about 38 or 40 inches long. Additionally, having both low and high vacuum apertures allows positioning of the high vacuum apertures at locations of high slurry and/or water production, and positioning of low vacuum apertures elsewhere where high vacuum is not as important. Nonetheless, the low vacuum apertures still help to collect the slurry to be picked up by a following or trailing high vacuum aperture.

In one preferred aspect of the present inventions, the low vacuum apertures are round or similarly shaped holes having walls 402, 404 and 406. The holes are preferably formed straight through the bottom wall 382 of the housing 374 perpendicular to the surface of the housing. However, the configurations of the holes can be different, as well as different from each other, in size, shape, positioning and orientation. For example, the low vacuum holes can be arranged in a series such as those shown in FIG. 9, aligned with one another, and also aligned with the end of the high vacuum aperture 394. The first one or several low vacuum holes, for example, can be the same size while following holes toward the rear of the vacuum bar can be larger in size, and therefore higher in vacuum. Conversely, they can decrease in size in the same direction. Additionally, the apertures can be placed other than in the center of the bottom wall 382.

In another preferred aspect of the present inventions, the high vacuum apertures are extended slots defined by substantially straight walls 408 joined by substantially circular end walls 410. The high vacuum apertures are also preferably formed straight through the bottom wall 382 of the housing 374 perpendicular to the surface. As with the low vacuum apertures, the high vacuum apertures can be different as well as different from each other in size, shape, position and orientation, and may vary in size from one end to the other of an individual slot.

The apertures, such as the high vacuum apertures, can be curved such as the high vacuum apertures 396 in the manifold 352. They also can have other shapes. The aperture 396 extends almost the entire length of the manifold and curves toward longitudinal center line of the manifold. Additionally, as can be seen in FIG. 9, a high vacuum aperture such as 396 can be formed from two or more openings, including 398. A second high vacuum aperture 412 may be formed from a long slot and two oppositely extending short slots. Additional high vacuum apertures 414 and 416 are preferably formed in the bottom wall 370 of the manifold and the bottom wall of the tail 362 of the vacuum bar, respectively, preferably aligned with the plane of the saw blade to remove slurry not only from the work surface but also the groove just cut.

The high vacuum aperture 414 is formed from a slot in the bottom 370 in the manifold and from a slot 418 (FIG. 8) formed in a vertical forward wall 372 of the manifold. As can be seen, a high vacuum aperture can be formed in two different surfaces of the vacuum bar. The slot 418 can be formed as its own high vacuum aperture positioned directly behind saw blade to pickup material thrown up by the saw blade. However, it is believed that a continuous high vacuum aperture formed by the slot 418 and the slot 414 is more effective at picking up slurry immediately behind the saw blade. The slot 418 can be wider than the other high vacuum slots, as can other high vacuum slots immediately behind the blade, or they can be the same width.

The first housing wall 374 may also include an additional high vacuum aperture 418 at a forward portion 420 of the first housing 374. The aperture 418 would be the forward-most aperture on the right side of the vacuum bar to be able to pickup water or slurry from the work surface. In the preferred embodiment, three low vacuum apertures 422 are positioned close behind and aligned with the high vacuum aperture 418.

In the preferred embodiment, the left vacuum bar 354 forms a second housing element 424 in fluid communication with the manifold and the first housing wall 374, extending forward of the manifold and slightly divergent from the first housing wall 374. The second housing element 424 also preferably includes a forward high vacuum aperture 426 to be the forward-most high vacuum aperture on the left side of the vacuum bar. It also includes a set or series of low vacuum apertures 428 preferably aligned with and rearward of the high vacuum aperture 426. An additional high vacuum aperture 430 may be formed between the low vacuum apertures 428 and the manifold 352.

As can be seen in FIG. 9, the high vacuum and low vacuum apertures can alternate and can be aligned with respect each other, preferably in the general direction of travel of the vacuum bar. The openings are preferably distributed over the vacuum bar so as to take advantage of the forward or backward motion of the saw. The different openings promote more even flow of the slurry relative to the vacuum bar and conserve vacuum pressure. The high vacuum and low vacuum apertures may alternate between a single large opening and a series of small openings, again followed by a large opening. The actual distribution, configuration and arrangement of the different apertures may be determined by a fluid dynamics computer program based on various input parameters, including available vacuum or suction, viscosity, desired flow rates, and the like. The openings are also given, typically, and the system works iteratively to develop possible solutions. While most of the apertures open downwardly from the bottom of the vacuum bar toward the work surface, at least one aperture 414 includes a portion (slot 418) that extends vertically, opening or facing other than downwardly. In one preferred embodiment, the low vacuum apertures are 0.125 in. in diameter (less a few thousandths of an inch for a powder coating on the vacuum bar) and separated from each other by about 0.750 in. They are preferably arranged in series of three. The width of the high vacuum apertures is preferably 0.125 in., and their length may range from less than an inch to several inches, depending on the length of the vacuum bar. The vacuum bar for a 16 in. saw blade can have high vacuum aperture lengths up to four or five inches or more for vacuum developed with a conventional saw with the system described herein.

FIG. 8A shows a bull-nosed end cap 432 for closing off the forward ends of the left and the right vacuum tubes and the rearward end of tube 362. The bull nose shape includes curved surfaces 434 for more easily negotiating or riding over pebbles or other objects which may be in the line of travel, such as created during cutting. The end caps are removable for easier cleaning of the vacuum bar.

The slurry recovery and separation assembly 320 (FIGS. 10–13) separates the air from the water coming from the vacuum hose 312, and therefore removes abrasive material from the air. Other damaging materials may also be present in the slurry, which are preferably removed from the air. The assembly 320 preferably includes a fluid-tight receptacle, container, canister or tank 436 for receiving a combination of the air and slurry, and including at least two vertically extending walls, such as right side wall 438 and front exit wall 440. The two walls meet and join at a vertically extending 90 degree angle 442 so that the potential for the air and slurry within the tank 436 to rotate or create a cyclone-type motion is reduced. The left side wall 444, similar in shape to the right side wall 438, also extends vertically and joins the front exit wall 440 at a vertically extending angle 446. Both of the left and right side walls meet and join a back inlet wall 448 at respective vertically extending angles or corners 450 and 452, respectively. The tank 436 is closed by a top or cover 454 which joins the respective side walls at 90 degree angles at a support flange 456 extending around the perimeter of the tank. It is removable for easy cleaning of the tank. The tank 436 preferably does not have a flat, horizontal bottom, to reduce splashing. The remaining walls between the left and right side walls are generally square or rectangular, join the respective side walls at 90 degree angles, preferably, but are arranged more or less horizontally or vertically as a function of location relative to an inlet or an outlet.

The back inlet wall 448 extends vertically a substantial portion of the height of the tank 436. The bottom joins a first shelf plate 458 at an angle 460 of approximately 100 degrees for allowing liquid to flow down the first shelf plate 458. The first shelf plate 458 slopes to a lower shelf plate 462. The first shelf plate 458 and the lower shelf plate 462 join at an angle 464 of approximately 200 degrees to minimize upward splashing of slurry, and to move slurry down to the bottom of the lower shelf plate 462 where it collects. The lower shelf plate 462 ends at and is supported by a pump support plate 464 and joins a slurry outlet plate 466 at an angle 468 of approximately 30 degrees, a small acute angle. This angle is relatively small so as to effectively retain the slurry in the relatively narrow bottom until it is pumped out by the pump 328 through a slurry outlet 470 located close to and connected to the pump by a short tube of about several inches. The slurry outlet plate 466 extends upwardly and rearwardly to approximately the same level as angle 464, where it joins a riser plate 472 at an angle 474 of approximately 223 degrees. The angle 474 is preferably greater than 180 degrees so as to increase the volume of the mid-level portion of the tank, or that portion of the volume of the tank between angle 474 and the top of the riser plate 472 and the back inlet wall 448, while still presenting a splash plate or wall tending to keep the slurry and any excess water between plates 462 and 466. The riser plate 472 is preferably at about a 15 degree angle from the vertical to provide a vertically extending wall for minimizing splashing while still providing an increasing volume in the upward direction and interrupting any direct line of air flow from the inlet to the air outlet. The riser plate 472 extends away from the back inlet wall 448 to allow air to travel more easily upward and away from the slurry.

The riser plate 472 joins an upper shelf plate 476 at an angle 478 of approximately 249 degrees. The upper shelf plate 476 extends forward to vertical front exit wall 440 where they join at an angle 480, The upper shelf plate 476 provides the base portion of the upper approximate one-third of the tank, measured vertically. The upper third of the tank preferably contains almost all air and very little moisture or slurry. The intermediate approximate one-third of the tank, measured vertically, will have a substantial portion of air and some water or slurry. The lower one-third, measured vertically, preferably has almost exclusively slurry. The depth of the slurry is preferably about 3 to 3½ inches.

The tank includes an inlet 482 for receiving a combination of air and slurry from the vacuum hose 312 and allowing the combination of air and slurry to flow into the tank. The inlet passes through the back inlet wall 448. The inlet 482 is preferably a relatively rigid tube or pipe 484 and extends a substantial distance from the wall 448 toward the riser plate 472 to a 90 degree elbow 486. The elbow 486 terminates in a wall 488 defining an opening 490 preferably facing directly downward toward lower shelf plate 462 for allowing the slurry to drop straight down. The opening 490 is preferably positioned below the upper shelf plate 476 so that there is no direct line of air flow between the opening 490 and the air outlet. The opening 490 as well as the rest of the inlet 482 are preferably two inches in diameter and may pass an approximately 3:1 ratio of air to slurry by cross-sectional area at about 200 cubic feet per minute. The opening 490 is positioned significantly below the upper shelf plate 476 so that the water and slurry are input well below the upper third of the tank. The inlet 482 is preferably centered between the left and right side walls. Additionally, the slurry is preferably input closer to the riser plate 472 than to the inlet plate 448 so that the slurry travels as little as possible before reaching the bottom of the tank and the slurry outlet 470. The opening 490 is preferably high enough above the slurry level that vacuum is still created in the vacuum line 312 without creating turbulence on the surface of the slurry at the bottom of the tank, while at the same time minimizing the height that the slurry must be raised from the suction bar to the inlet 482.

A second, air outlet 492 removes air from the tank 436 thereby creating a vacuum within the tank, which creates a vacuum within the vacuum hose 312 for producing suction in the suction bar 310. The air outlet 492 is preferably centered between the side walls and located close to the air outlet wall 440 and a significant distance from the slurry in the bottom of the tank. The air outlet is not located on any line or plane of symmetry other than between the two side walls thereby reducing the possibility that air being removed from the tank is part of a channel of air flow. The air travels a significant distance through the tank to reach the outlet, and does not have a direct line of travel between the opening 490 and the outlet 492. The outlet 492 includes a wall 494 for defining an opening 496 which is preferably flush with the top 454 of the tank.

The separation tank promotes organized control of the slurry and disorganized or uncontrolled flow of air within the tank. The irregular surfaces and discontinuous walls in the tank reduces cyclone-type fluid flow within the tank which would tend to keep moisture and particulates carried in the air. The inlet is placed close to the slurry or other material outlet and close to a wall to help contain the material flow. Residual splashing is minimized as much as possible by interrupting any straight or parabolic air path and any air flow channels, and reducing symmetries of surfaces within the tank, while encouraging a gentle gradient of air flow from the area of the inlet portion of the tank to the outlet portion of the tank. Additionally, it is preferred to minimize the amount of directional change of the air and slurry coming out of the opening 490. It is also preferred to place the inlet opening far enough away from any given surface to minimize funneling or channeling of air upward past the opening 490. One measure of one preferred inlet position is to have a relatively large change in cross-sectional area going from the opening 490 into the open tank and reducing the velocity of the air and slurry mixtures. Additionally, a large total volume for the tank is preferred.

Some exemplary approximate dimensions for the separation tank have the width equal to about 9 and ½ in. and the overall length about 27 inches. The inlet wall is about 12 inches high and height from the pump support plate 464 to the top of the tank is about 18 inches. The plate 440 is about five inches high, the plate 476 about 13 inches long and the plate 472 about eight inches long. The plate 466 is about four inches long and the plate 462 about eight inches long. The plate 458 is about seven inches long. The length of the inlet 482 from the center of the opening 490 to the outer most point of the pipe outside the tank is about 13 and ½ inches. These dimensions give a tank having a low height, large volume and a relatively large transition from the inlet pipe to the tank.

A level indicator or overflow alarm (not shown) can be included to indicate when the level of slurry reaches a selected level. Other indicators and safety features can be included as desired to make easier becoming familiar with a machine and for using the machine.

Power to the pump 328 is provided by a sealed conductor 498 extending from a fast hook-up and disconnect junction and switch box 500, mounted at the inlet panel 448, to the pump 328. The conductor extends through a sealed opening in the panel 466. A shut-off switch 502 can be used to start or stop the pump.

Figure 14:
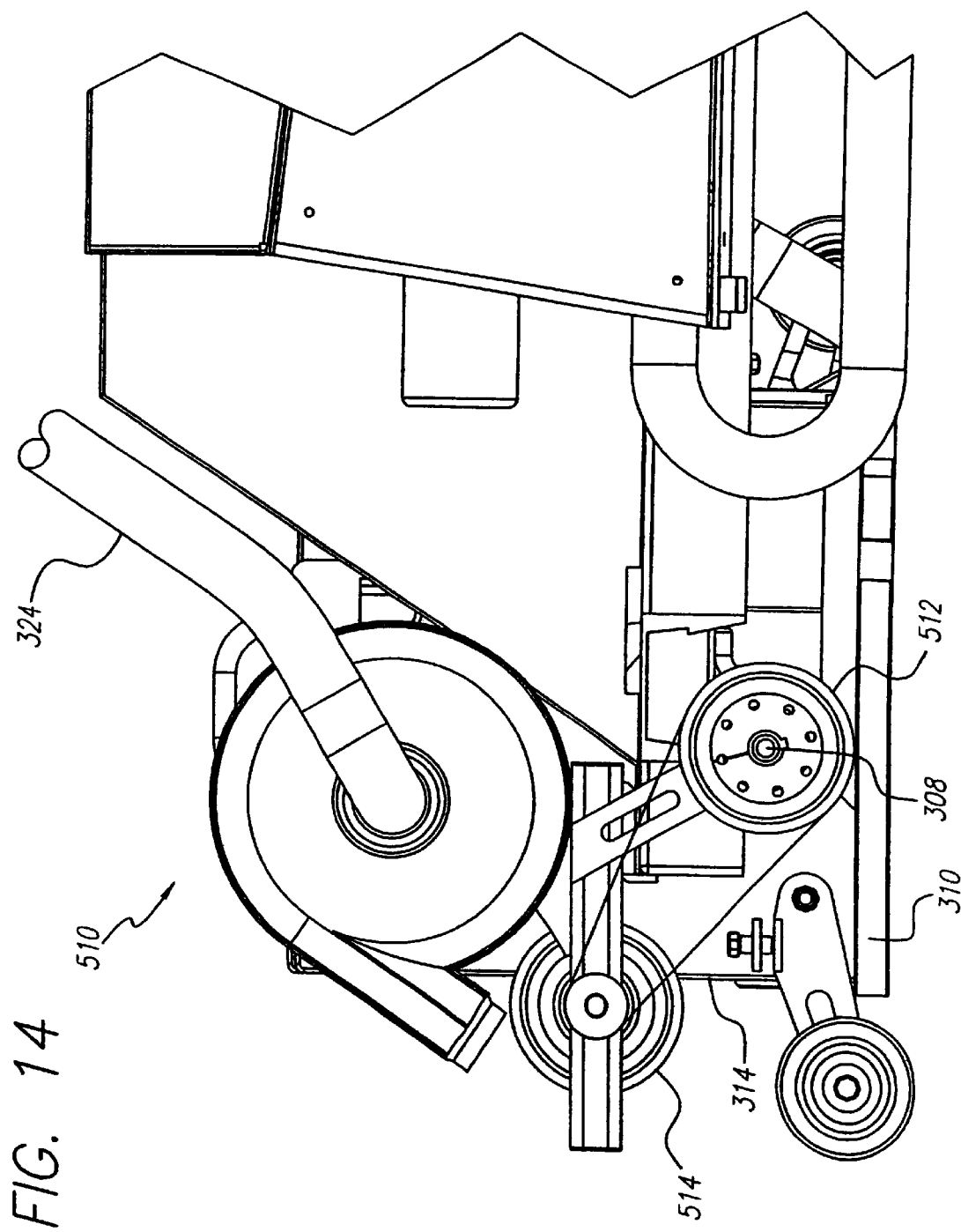
FIG. 14 is a partial left elevation view of the saw of FIG. 1 showing a vacuum generator and its drive mechanism.

A mounting plate 504 (FIGS. 13 and 14) can be fastened to the side of the saw so that the separation tank and pump assembly can be removably mounted to the saw through hooks or other brackets 506. The plate and hooks are preferably configured to insure that the separation tank and pump assembly maintain a center of gravity for the tank.

Figure 15:
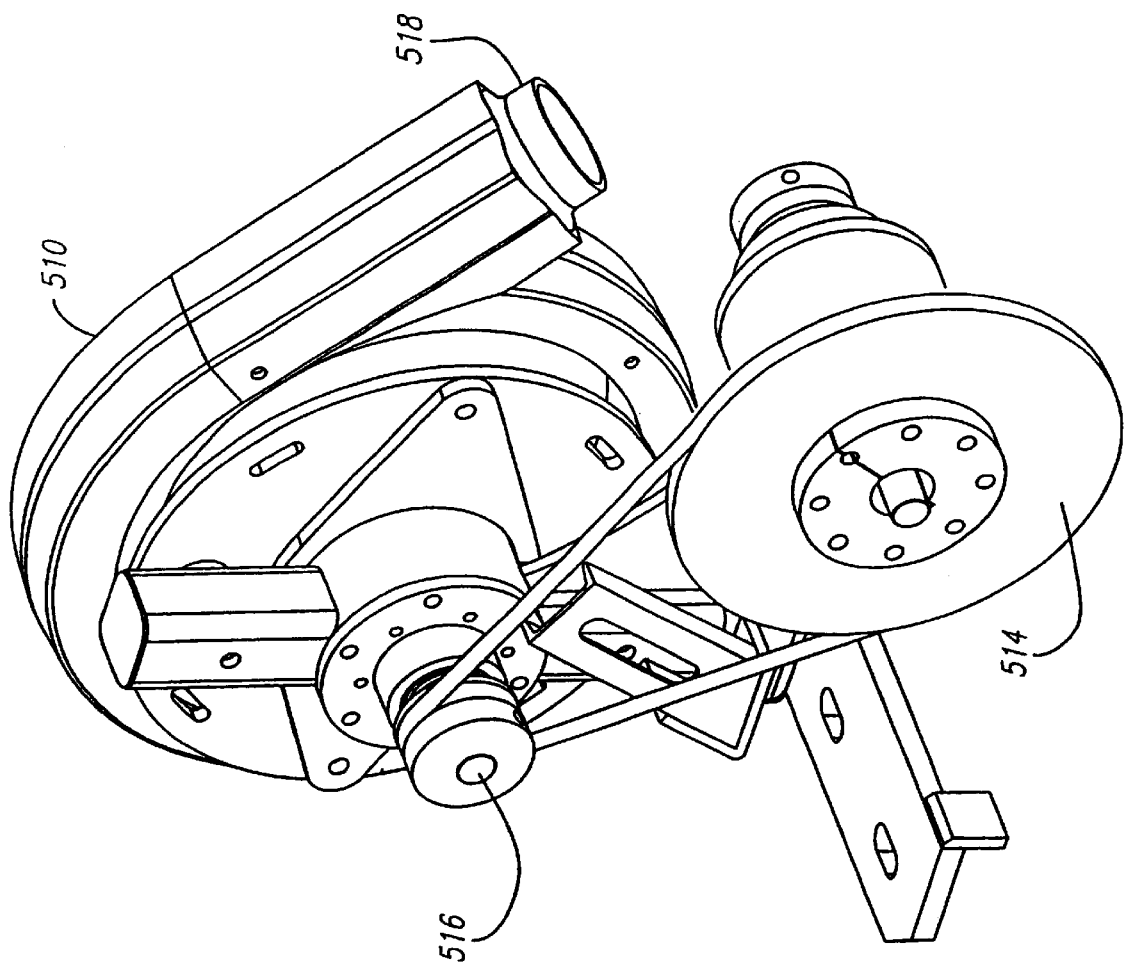
FIG. 15 is a right side isometric view of the vacuum generator and its drive transmission assembly and mounting assembly.
Figure 16:
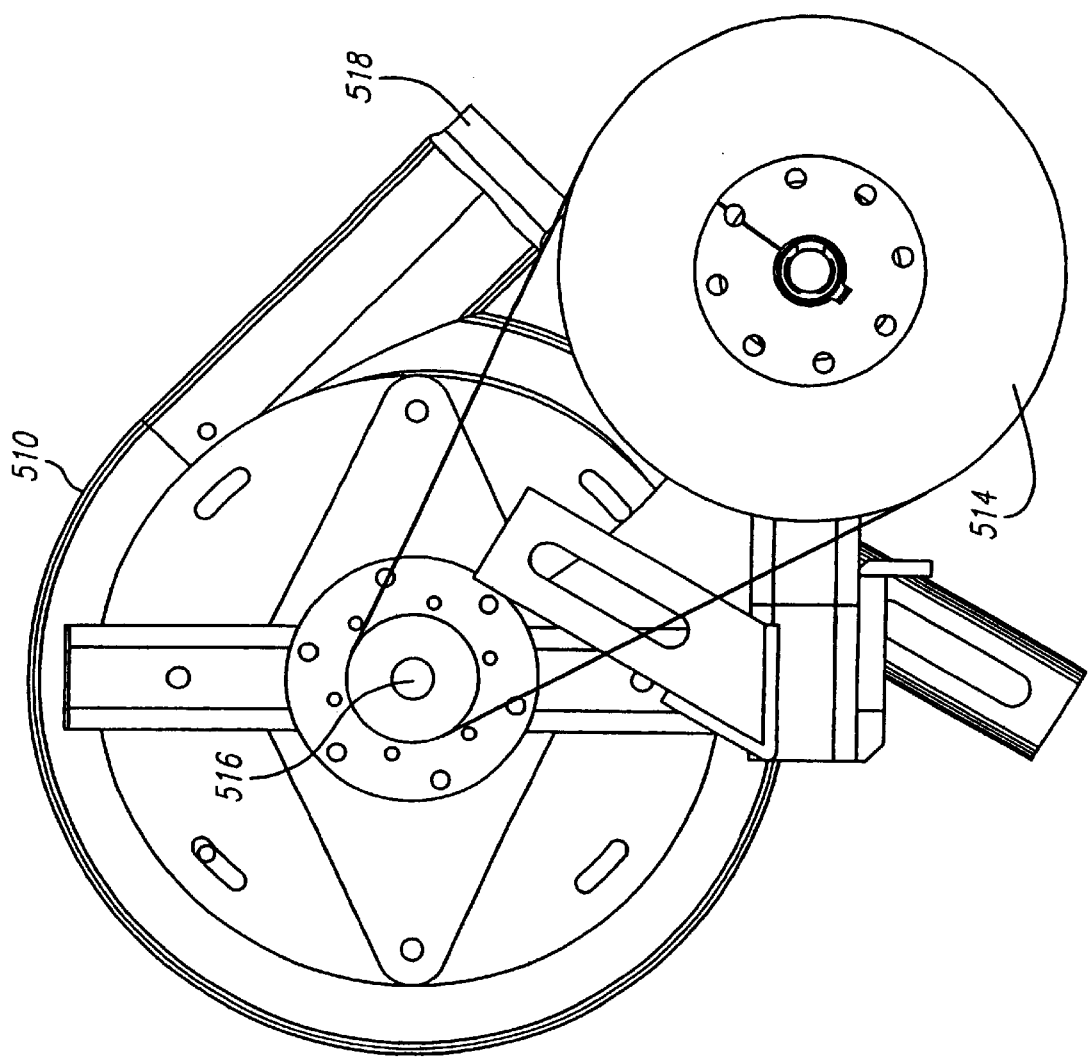
FIG. 16 is a right side elevation view of the assemblies of FIG. 15.

The vacuum generator 322 includes a housing 508 (FIG. 1) for containing an impeller or fan 510 (FIGS. 15–17) for creating a vacuum in the tank. The fan may be a Breuer Electric Mfg. Tornado with a number 12692 impeller capable of generating at least 180 to 184 cubic feet per minute of flow, or more, at 16,500 rpm through a two inch diameter orifice. The fan is preferably rated for fifty-one inches of static water lift. The fan chamber part number 12642 and the fan chamber plate part number 11237 are also included. The fan is driven off of the saw blade drive shaft 308 through a pulley 512 which drives a second pulley 514, which in turn drives the shaft 516 of the fan. The fan exhaust 518 is directed into the housing 508 for cooling the high speed bearings and/or components of the saw.

The fan and two idlers (one for each drive belt, not shown) are each supported by two high speed, long life and lifetime lubricated bearings mounted, supported and protected on the saw frame by suitable supports. The bearings are preferably rated for at least the 16,500 rpm operating conditions, and preferably higher. The preferred bearings are SKF Mfg. number 6202-2Z/C3HT bearings rated for 29,000 rpm.

Figure 17:
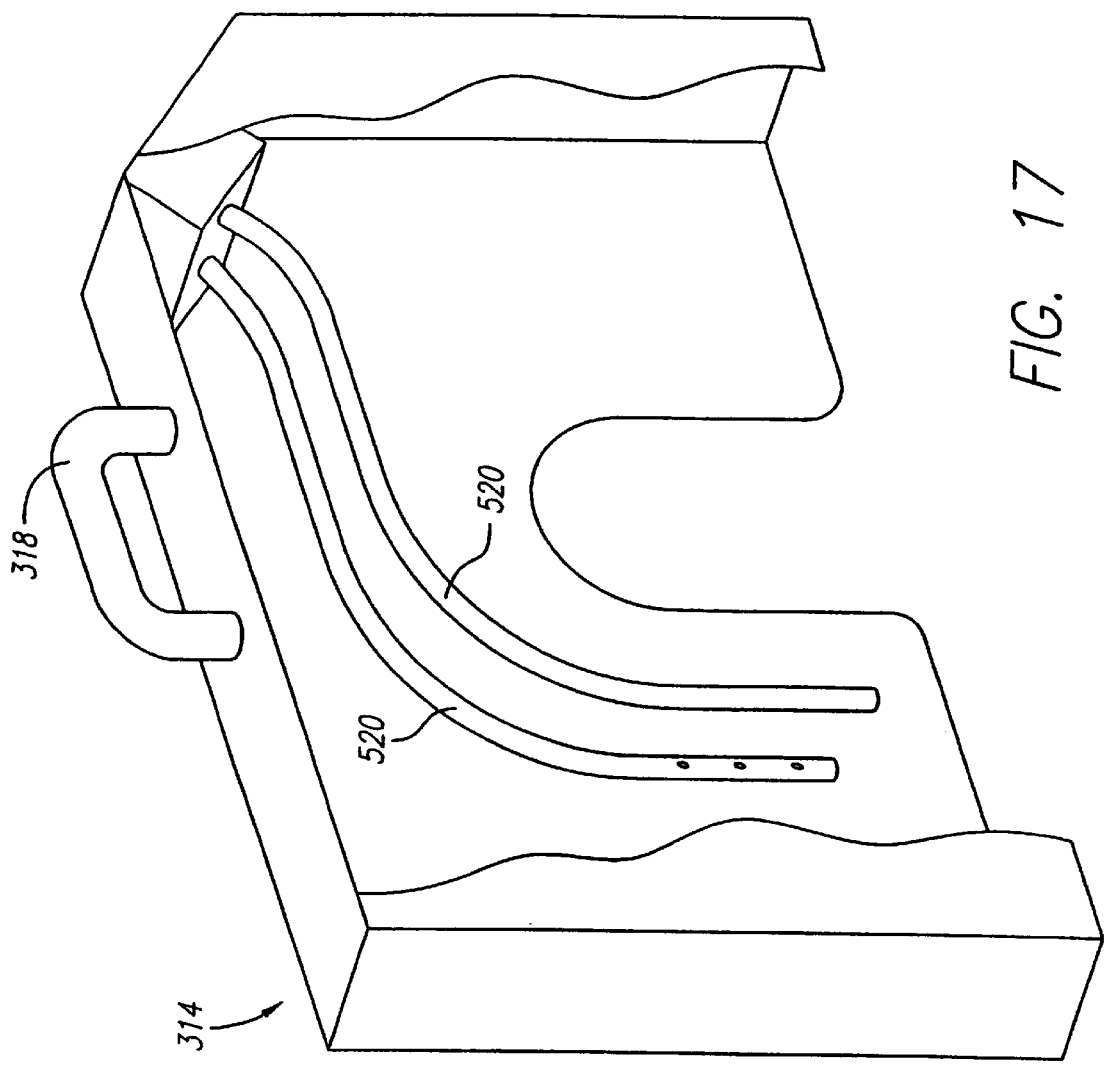
FIG. 17 is a side elevation view and partial cut-away of a blade guard showing water tubes for wetting the saw blade.
Figure 17A:
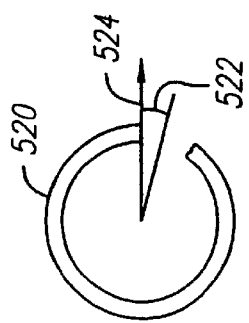
FIG. 17A is a detail of a water tube of FIG. 17.

The tool guard such as the blade guard 314 includes a water supply conduit or tube 520 for projecting or spraying fluid onto the saw blade (FIG. 17). The water is directed toward the tool at an angle different than 90 degrees. For example, the water can be directed backward toward the rotationally-advancing side of the blade. Directing the water backward relative to the rotation of the blade reduces the amount of water thrown forward of the blade. Consequently, the amount of water to be picked up at the front of the blade is reduced. In one preferred embodiment, the water is directed backward at an angle 522 of about three degrees from a line 524 perpendicular to the blade.

By including a vacuum generator on the saw driven by the saw engine or other power supply, the components of the saw can still be part of a self-contained unit. The vacuum generator can operate and produce the desired vacuum under a number of different conditions, such as different saw blade sizes, cutting speeds and the like. The vacuum generator can also be easily mounted on and removed from the saw along with the other slurry containment components. The separation tank, the suction bar, the pump assembly, blade guard and vacuum hose can be easily installed on existing saws and removed if desired. The components can be made available in kit form or installed at the factory.

The waste containment and separation system can be used in other applications beyond concrete saws. Wall saws, grinding heads and core drills also produce particulates that can be contained through application of one or more of the concepts described herein. For example, using high and low vacuum apertures in a pickup element conserves vacuum pressure and permits a selective arrangement of high vacuum pickup locations. Vacuum generators can also be driven off of the drive elements of the tools, if desired. Additionally, the concepts developed for separating air from a slurry for maintaining the integrity of the vacuum generator can be applied to other applications. The amount of feedback of damaging particulates or other contaminants can be reduced, thereby extending the life of many components. Filters may not be necessary, as they reduce the vacuum and produce drag.

Having thus described several exemplary implementations of the invention, it will be apparent that various alterations and modifications can be made without departing from the inventions or the concepts discussed herein. Such operations and modifications, though not expressly described above, are nonetheless intended and implied to be within the spirit and scope of the inventions. Accordingly, the foregoing description is intended to be illustrative only.

What is claimed is:

1. A separation system for separating air and fluid, the system comprising:
   a fluid-tight receptacle for receiving a combination of air and a second fluid, the receptacle including at least two vertically extending walls joining at a vertically extending angle;
   an inlet for receiving the combination of air and the second fluid and allowing the combination of air and the second fluid to flow into the receptacle;
   a first material outlet in a bottom of the receptacle for passing the second fluid from the receptacle; and
   a second outlet for allowing air to pass from the receptacle.

2. A fluid separation system for a portable cutting or drilling machine, the system comprising:
   a receptacle for receiving a combination of air and a second fluid, the receptacle including at least two vertically extending walls joining at a vertically extending angle and further including two vertically extending walls separated by a horizontally extending wall having at least a portion extending above a first level;
   an inlet for receiving the combination of air and the second fluid and allowing the combination of air and the second fluid to flow into the receptacle and wherein the inlet has an inlet opening that is below the first level;
   a first material outlet for passing the second fluid from the receptacle; and
   a second outlet for allowing air to pass from the receptacle.

3. The fluid separation system of claim 2 wherein the receptacle includes first and second oppositely facing sides with a center in between and wherein the second outlet is off center.

4. The fluid separation system of claim 2 wherein the receptacle includes first and second oppositely facing sides with a center in between and wherein the first outlet is centered.

5. The fluid separation system of claim 2 wherein the inlet includes an opening and wherein the inlet opening is approximately centered vertically in the receptacle.

6. The fluid separation system of claim 2 wherein the inlet includes an opening and wherein the inlet opening is approximately centered laterally in the receptacle.

7. The fluid separation system of claim 2 wherein the inlet is centered over the first outlet.

8. The fluid separation system of claim 2 wherein the inlet extends from a first vertically extending wall toward a second vertically extending wall facing the first vertically extending wall and has an opening that is closer to the second wall than the first wall.

9. The fluid separation system of claim 2 wherein the second outlet is flush with a top.

10. The fluid separation system of claim 2 wherein the first outlet is flush with a surface and the surface forms an acute angle with another surface of the receptacle.

11. A fluid separation system for a portable cutting or drilling machine, the system comprising:
    a receptacle for receiving a combination of air and a second fluid, the receptacle including at least two vertically extending walls joining at a vertically extending angle, the receptacle having a maximum height from a top to a bottom and where the bottom is other than flat;
    an inlet for receiving the combination of air and the second fluid and allowing the combination of air and the second fluid to flow into the receptacle, and having a wall defining an opening for the inlet closer to the bottom of the receptacle than to the top of the receptacle;
    a first material outlet in a bottom portion of the receptacle for passing the second fluid from the receptacle; and
    a second outlet for allowing air to pass from the receptacle.

* * * * *

UNITED STATES PATENT AND TRADEMARK OFFICE
CERTIFICATE OF CORRECTION

PATENT NO.      : 6,626,166 B1
DATED           : September 30, 2003
INVENTOR(S)     : Anthony Baratta It is certified that error appears in the above-identified patent and that said Letters Patent is hereby corrected as shown below:

<u>Title page, Item [54] and Column 1, lines 1-3,</u>
Change the Title to read -- WASTE CONTAINMENT AND SEPARATION SYSTEM FOR AN ABRADING OR CUTTING DEVICE --

Signed and Sealed this

Twentieth Day of January, 2004

JON W. DUDAS
*Acting Director of the United States Patent and Trademark Office*